(12) United States Patent
Iname et al.

(10) Patent No.: US 10,156,837 B2
(45) Date of Patent: Dec. 18, 2018

(54) CONTROL SYSTEMS FOR SETTING SAMPLING TIMING

(71) Applicant: OMRON Corporation, Kyoto-shi, Kyoto (JP)

(72) Inventors: Yukio Iname, Kyoto (JP); Koji Yaoita, Kyoto (JP); Yoshitaka Takeuchi, Otsu (JP); Takamasa Ueda, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 140 days.

(21) Appl. No.: 15/123,294

(22) PCT Filed: Jan. 15, 2015

(86) PCT No.: PCT/JP2015/050944
§ 371 (c)(1),
(2) Date: Sep. 2, 2016

(87) PCT Pub. No.: WO2015/136971
PCT Pub. Date: Sep. 17, 2015

(65) Prior Publication Data
US 2017/0068236 A1    Mar. 9, 2017

(30) Foreign Application Priority Data

Mar. 14, 2014  (JP) ................................ 2014-052819

(51) Int. Cl.
*G05B 19/42*    (2006.01)
*G05B 19/05*    (2006.01)
(52) U.S. Cl.
CPC ......... *G05B 19/056* (2013.01); *G05B 19/054* (2013.01); *G05B 2219/34269* (2013.01); *G05B 2219/34301* (2013.01)
(58) Field of Classification Search
CPC ................ G05B 19/056; G05B 19/054; G05B 2219/34301; G05B 2219/34269
See application file for complete search history.

(56) References Cited

U.S. PATENT DOCUMENTS

| | | | |
|---|---|---|---|
| 5,146,417 A | * | 9/1992 | Watson ................ G01P 7/00 341/120 |
| 2005/0184898 A1 | | 8/2005 | Jiang et al. |
| 2010/0049337 A1 | | 2/2010 | Sakagami et al. |
| 2010/0153065 A1 | | 6/2010 | Kawamura et al. |
| 2014/0018958 A1 | | 1/2014 | Ueno et al. |
| 2014/0058538 A1 | | 2/2014 | Yaoita et al. |
| 2016/0033953 A1 | | 2/2016 | Nakagawa |

FOREIGN PATENT DOCUMENTS

| | | |
|---|---|---|
| CN | 1658509 A | 8/2005 |
| CN | 101467111 A | 6/2009 |
| CN | 101622688 A | 1/2010 |
| CN | 102841580 A | 12/2012 |
| CN | 103430111 A | 12/2013 |

(Continued)

OTHER PUBLICATIONS

Japanese Office Action dated Jan. 30, 2018 in a related Japanese patent application.

(Continued)

*Primary Examiner* — Adam Lee
(74) *Attorney, Agent, or Firm* — Metrolexis Law Group, PLLC

(57) ABSTRACT

A control system easily adjusts devices. In a control system, an input unit included in a PLC system obtains actual sampling data. An output unit outputs an output signal based on output instruction data including a designated output timing and a designated output signal value. A task execution unit included in a controller repeatedly executes a task in a predetermined period. A sampling unit obtains variable sampling data. A same time-series data generation unit included in a development support apparatus generates same time-series data. A same time-series data display unit displays the same time-series data on the same time axis.

24 Claims, 12 Drawing Sheets

(56) References Cited

FOREIGN PATENT DOCUMENTS

| CN | 103543685 A | 1/2014 |
|---|---|---|
| EP | 2549344 A1 | 1/2013 |
| JP | 2000-293208 A | 10/2000 |
| JP | 2003-248504 A | 9/2003 |
| JP | 2009-146040 A | 7/2009 |
| JP | 5252014 B2 | 7/2013 |
| WO | 2014167726 A1 | 10/2014 |

OTHER PUBLICATIONS

Yongshun Jin et al., "LabView Based Experimental Validation of Fractional Order Motion Controllers", 2009 Chinese Control and Decision Conference, Jun. 17, 2009, pp. 323-328, IEEE, USA; Relevance is indicated in the extended European Search Report dated Mar. 14, 2018.

Hong Tan, "Using an Oversample Technique to Improve Servo Control Performance", International Conference on Industrial Electronices, Control, and Instrumentation, Nov. 9, 1997, pp. 62-67, Institute of Electrical and Electronics Engineers, New Orleans; Relevance is indicated in the extended European Search Report dated Mar. 14, 2018.

"Connect LabVIEW to Any PLC Using OPC", National Instruments, Nov. 21, 2012, Retrieved from http://www.ni.com/tutorial/7450/en/ on Feb. 9, 2018; Relevance is indicated in the extended European Search Report dated Mar. 14, 2018.

Extended European search report dated Mar. 14, 2018 in the counterpart European patent application.

Chinese Office Action dated Apr. 23, 2018 in a counterpart Chinese Patent application.

\* cited by examiner

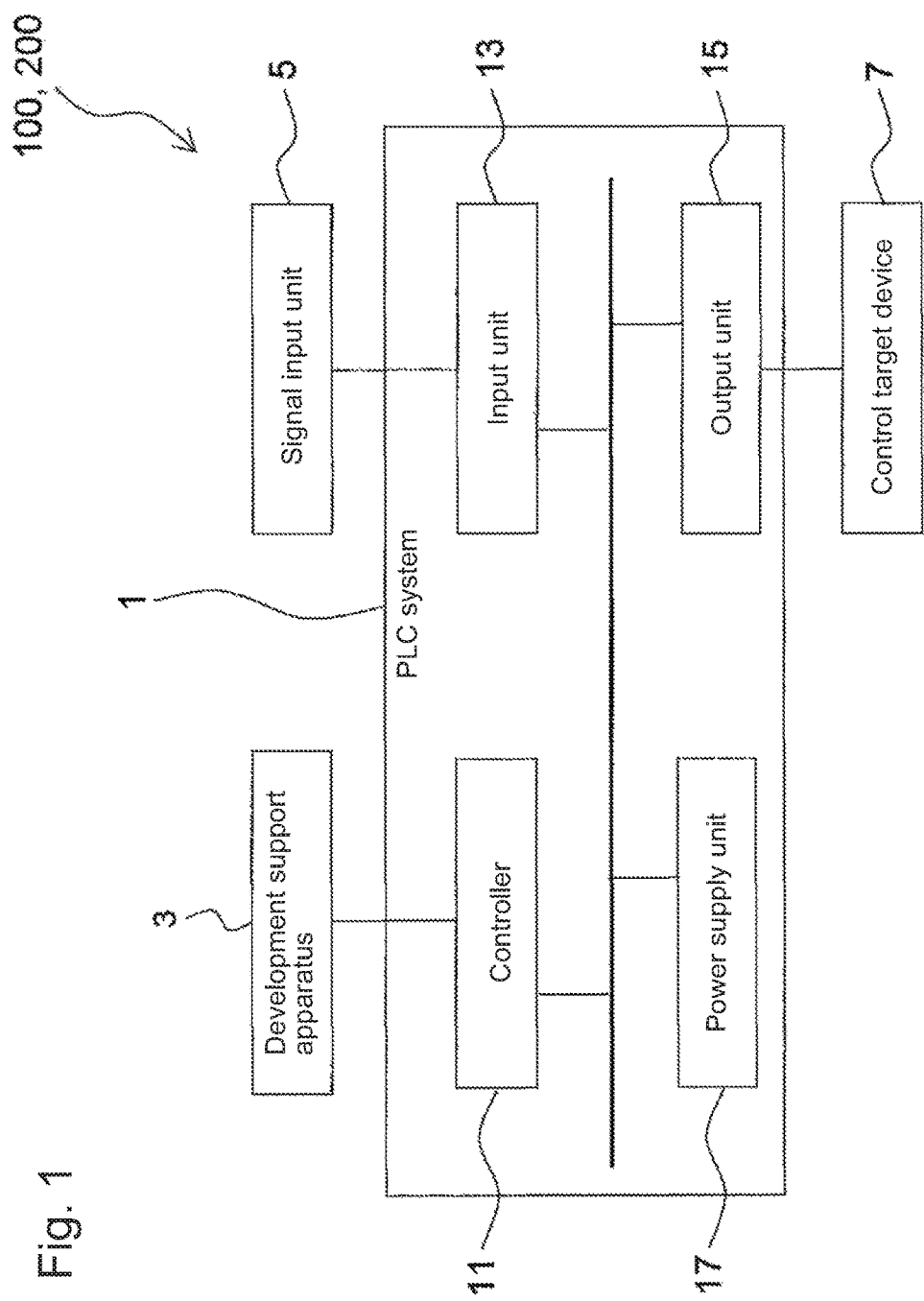

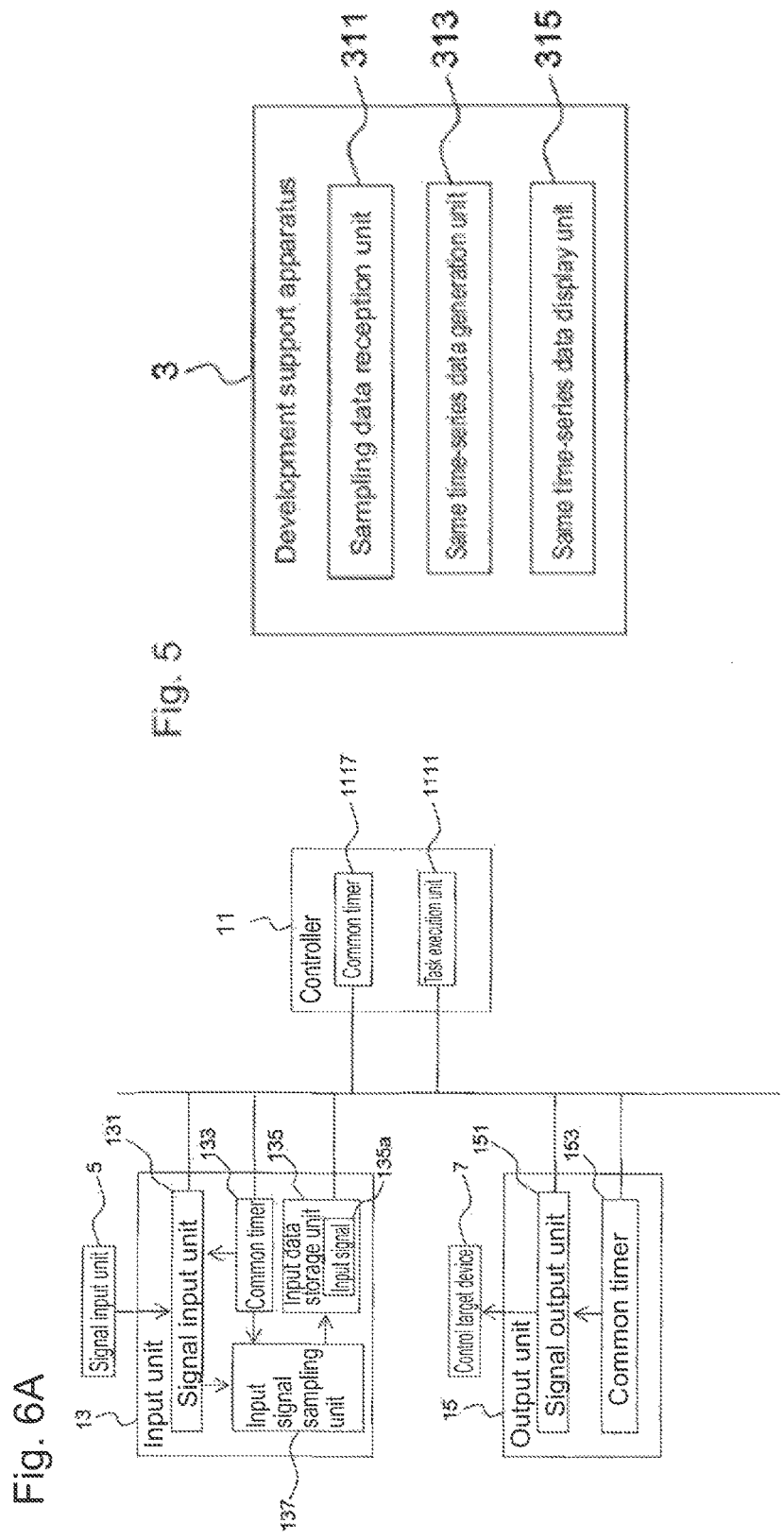

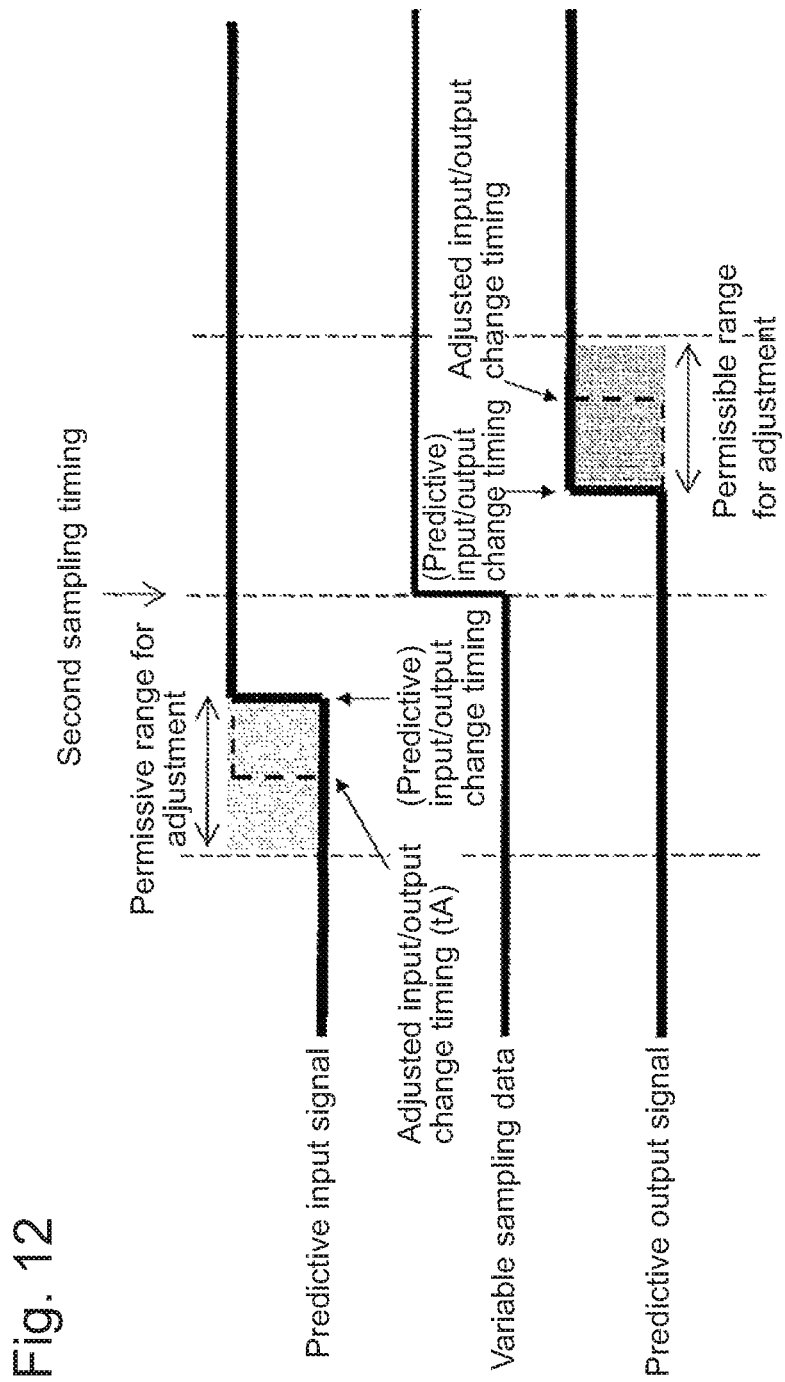

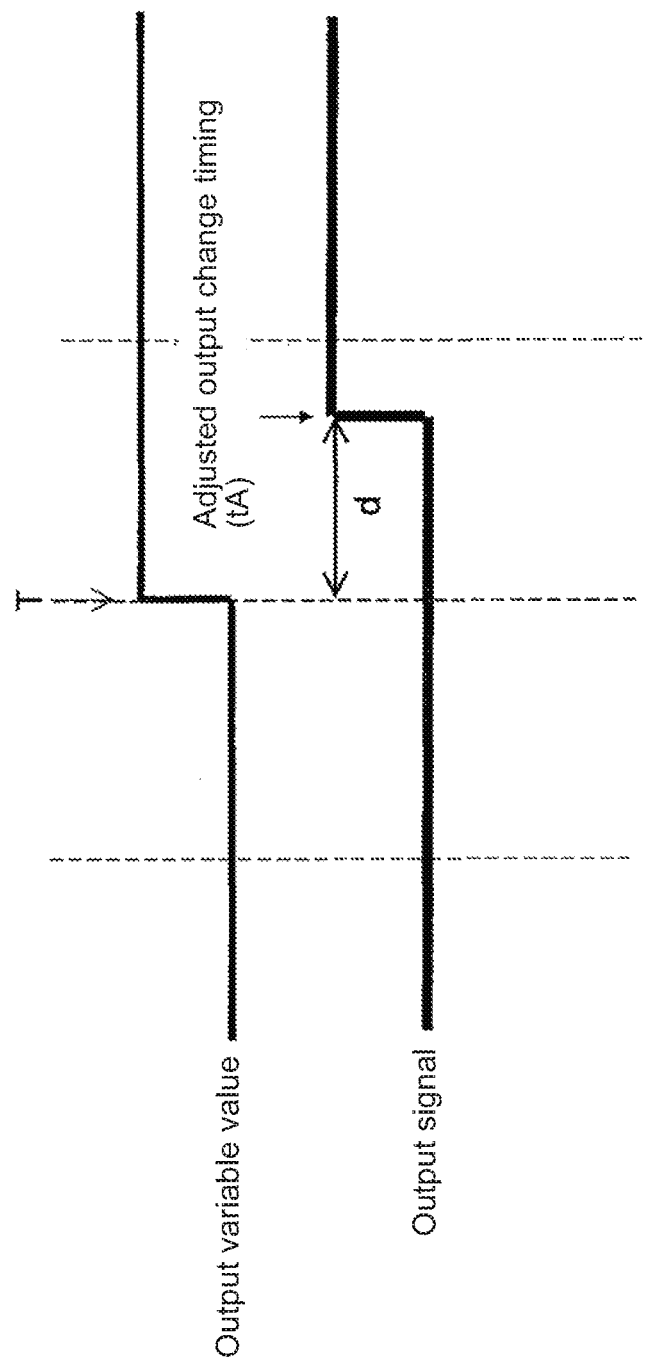

CONTROL SYSTEMS FOR SETTING SAMPLING TIMING

FIELD

The present invention relates to a control system capable of sampling input and output signals and internal variables.

BACKGROUND

A controller or a programmable logic controller (PLC) system known in the art may control a control target device by executing a task including a user program in every predetermined period to calculate an output signal based on an external input signal and output the signal. The controller may have the function (trace function) of tracing temporal changes in an input signal and an output signal (input and output signals).

For example, Patent Literature 1 describes a controller that collects variables referred to and updated by a user program during execution of a task including the user program.

CITATION LIST

Patent Literature

Patent Literature 1: Japanese Patent No. 5252014

SUMMARY

Technical Problem

The controller known in the art implements the trace function internally. The controller samples variables that are associated with the above input and output signals to obtain the above input and output signals. In contrast, an actual input signal input into the controller and an actual output signal output from the controller are sampled independently of the above trace function. Thus, changes in variables used in the controller have been difficult to compare with the actual input and output signals by comparing the data obtained by the trace function with the sampled actual input and output signals (sampling data).

When the comparison is difficult between the variables used in the controller and the actual input and output signals as described above, the controller, the device that obtains an input signal (e.g., an input unit), and the device that outputs an output signal (e.g., an output unit) can be adjusted with lower efficiency. Such devices are adjusted after the controller (control system) is completed, and thus changes in the system or control target devices are to be avoided. Thus, the adjustments are to be performed within the input unit, the controller, and the output unit in the PLC system. This issue is not negligible when the system controlled by the controller is larger.

One or more aspects of the present invention are directed to a control system that allows easy adjustment of devices.

Solution to Problem

In response to the above issue, a plurality of aspects will now be described. These aspects can be freely combined as appropriate.

A control system according to one aspect of the present invention includes a PLC system and a development support apparatus.

The PLC system includes an input unit, an output unit, and a controller. The input unit obtains actual sampling data storing a first sampling value and a first sampling timing that are associated with each other. The first sampling value is obtained by sampling an input signal at a first timing. The first sampling timing is a timing at which the input signal is sampled.

The output unit outputs an output signal based on output instruction data including a designated output timing and a designated output signal value. The designated output signal value is an output signal value to be output at the designated output timing.

The controller includes a task execution unit and a sampling unit.

The task execution unit repeatedly executes a task including I/O refresh processing and processing for executing a user program in a predetermined period. The I/O refresh processing is processing for updating a value of an input variable associated with the input signal based on the input signal, and updating the output signal based on an output variable associated with the output signal. The processing for executing the user program is processing for calculating a value of the output variable by executing the user program based on the input variable, calculating the designated output timing and the designated output signal value based on the value of the output variable to generate the output instruction data, and transmitting the output instruction data to the output unit.

The sampling unit obtains variable sampling data storing a second sampling value and a second sampling timing that are associated with each other. The second sampling value is obtained by sampling the input variable, the output variable, and/or an internal variable at a second timing. The internal variable is a variable used in the user program. The second sampling timing is a timing at which the input variable, the output variable, and/or the internal variable is sampled.

The development support apparatus includes a same time-series data generation unit and a same time-series data display unit.

The same time-series data generation unit generates data in the same time series (same time-series data). The same time-series data is data storing the first sampling timing, the second sampling timing, and the designated output timing arranged in the same time series. The first sampling value, the second sampling value, and the designated output signal value are associated with timings in the same time series corresponding to the first sampling timing, the second sampling timing, and the designated output timing.

The same time-series data display unit displays the same time-series data on the same time axis.

In the above control system, the input unit samples the input signal at the first timing to obtain the first sampling value, and samples the timing at which the input signal is sampled to obtain the first sampling timing, and obtains the actual sampling data storing the first sampling value and the first sampling timing that are associated with each other.

The sampling unit in the controller samples the input variable, the output variable, and/or the internal variable at the second timing to obtain the second sampling value, and samples the timing at which the variable(s) is sampled to obtain the second sampling timing, and obtains the variable sampling data storing the second sampling value and the second sampling timing that are associated with each other.

Further, when the task execution unit in the controller executes the processing for the user program, the user program calculates the output variable value based on the input variable, calculates the designated output timing and the designated output signal value to be output at the designated output timing based on the output variable value, and transmits the output instruction data including the designated output timing and the designated output signal value to the output unit.

In the development support apparatus, the same time-series data generation unit arranges the first sampling timing, the second sampling timing, and the designated output timing in the same time series. The same time-series data generation unit then generates the same time-series data storing the first sampling value, the second sampling value, and the designated output signal value that are associated with the timings in the same time series corresponding to the first sampling timing, the second sampling timing, and the designated output timing. The same time-series data display unit then displays the same time-series data.

In this manner, the above control system aligns the actual sampling data, the variable sampling data, and the output instruction data in the same time series to generate the single set of same time-series data. The development support apparatus displays the same time-series data on the same time axis. This allows checking of the relationship between the above sampling result and the designated output signal value on the same time axis, without performing the procedure for aligning individual data pieces. This allows easy adjustment of devices without placing a large burden on, for example, a system developer.

The input unit may include a high-speed sampling input unit. The high-speed sampling input unit is an input unit that samples the first sampling value in every high-speed sampling period shorter than a predetermined period for executing a task, and sets a timing determined by the high-speed sampling period as the first sampling timing. This structure allows sampling of the input signal more accurately in a period shorter than the predetermined period, which is the execution period for a task.

The input unit may include a change timing obtaining input unit. The change timing obtaining input unit is an input unit that sets a timing at which the input signal undergoes a predetermined change as the first timing, sets a signal value of the input signal after the predetermined change as the first sampling value, and sets a timing determined by the first timing as the first sampling timing. This structure allows accurate sampling of the timing at which the input signal undergoes the predetermined change together with the input signal value at the timing of change, independently of the execution period for a task (predetermined period).

The input unit may receive the input signal at a designated input timing. This allows reception of the input signal, independently of the execution period for a task (predetermined period).

The input unit may receive the input signal at the designated input timing that is a timing determined by a high-speed input period shorter than the predetermined period. This allows reception of the input signal in a period shorter than the execution period for a task (predetermined period), independently of the execution period for a task.

The output unit may include a high-speed output unit. The high-speed output unit is an output unit that sets a timing determined by a high-speed output period shorter than the predetermined period for executing the task as the designated output timing, and sets a signal value to be output in every high-speed output period as the designated output signal value, and outputs the output signal. This allows output of the output signal controlled more precisely in a period shorter than the predetermined period, independently of the execution period for a task (predetermined period).

The output unit may include a timing designation output unit. The timing designation output unit is an output unit that sets a predetermined timing as the designated output timing, and sets a signal value to be output at the predetermined timing as the designated output signal value, and outputs the output signal. This allows output of the output signal with any signal value at any predetermined timing, independently of the execution period for a task (predetermined period).

The control system may further include a common timer. The common timer obtains the first sampling timing, the second sampling timing, and the designated output timing at a common timing. This reduces differences between the timing obtained in the input unit, the timing obtained in the output unit, and the timing obtained in the controller in the control system.

The output unit may associate a sampling output signal value obtained by sampling the output signal at the predetermined timing with an output sampling timing determined by the predetermined timing in the actual sampling data. This allows sampling of the actual output signal.

The same time-series data generation unit may further arrange the output sampling timing in the same time series, and may associate the sampling output signal value with a timing in the same time series corresponding to the output sampling timing in the same time-series data. This allows the sampling result of the actual output signal to be displayed on the same time axis.

A control system according to another aspect of the present invention includes a PLC system and a development support apparatus.

The PLC system includes an input unit, an output unit, and a controller. The input unit receives an input signal. The output unit outputs an output signal.

The controller includes a task execution unit and a sampling unit.

The task execution unit repeatedly executes a task in a predetermined period. The task includes I/O refresh processing for updating an input variable associated with the input signal based on the input signal and updating the output signal based on an output variable associated with the output signal, and processing for executing a user program including calculating a value of the output variable by executing the user program based on the input variable.

The sampling unit obtains variable sampling data storing a second sampling value and a second sampling timing that are associated with each other. The second sampling value is obtained by sampling the input variable, the output variable, and/or an internal variable at a second timing. The internal variable is a variable used in the user program. The second sampling timing is a timing at which the input variable, the output variable, and/or the internal variable is sampled.

The development support apparatus includes an input-output change timing prediction unit, a predictive input-output signal generation unit, and a same time-series data display unit.

The input-output change timing prediction unit predicts an input change timing and/or an output change timing based on a connection between the input unit and/or the output unit with the controller, a communication speed, an operational speed for performing a predetermined operation in the input unit and/or the output unit, and the second sampling timing. The input change timing is a timing at which a signal value of the input signal changes to a value corresponding to an input variable value at the second sampling timing. The output change timing is a timing at which a signal value of the output signal changes to a value corresponding to an output variable value at the second sampling timing.

The predictive input-output signal generation unit generates predictive input signal data and/or predictive output signal data. The predictive input signal data is data generated by associating the input variable value at the second sampling timing with the input change timing. The predictive output signal data is data generated by associating the output variable value at the second sampling timing with the output change timing.

The same time-series data display unit displays the variable sampling data, the predictive input signal data, and/or the predictive output signal data on the same time axis.

In the above control system, the sampling unit in the controller samples the input variable, the output variable, and/or the internal variable and sets the sampled data as the second sampling value, and samples the timing at which the input variable, the output variable, and/or the internal variable is sampled and sets the sampled timing as the second sampling timing to obtain the variable sampling data.

In the development support apparatus, the input-output change timing prediction unit predicts the input change timing that is the timing at which the signal value of the input signal changes to the value corresponding to the input variable value at the second sampling timing, and/or the output change timing that is the timing at which the signal value of the output signal changes to the value corresponding to the output variable value at the second sampling timing, based on the connection between the input unit and/or the output unit with the controller, the communication speed, the operational speed for performing a predetermined operation in the input unit and/or the output unit, and the second sampling timing.

The predictive input-output signal generation unit associates the input variable value at the second sampling timing with the input change timing to generate the predictive input signal data, and associates the output variable value at the second sampling timing with the output change timing to generate the predictive output signal data.

Further, the same time-series data display unit displays the variable sampling data, the predictive input signal data, and/or the predictive output signal data on the same time axis.

The above structure allows prediction of the timing to receive or latch the input signal input to the input unit and/or the actual output signal output from the output unit based on the variables used in the controller, without sampling the input signal and/or the output signal. This further allows checking of the relationship between the sampling results of the variables and the predictive input signal and/or the predictive output signal on the same time axis, without performing the procedure for aligning individual data pieces. This allows easy adjustment of devices without placing a large burden on, for example, a system developer.

The development support apparatus may further include an input-output timing adjustment unit. The input-output timing adjustment unit adjusts the input change timing and/or the output change timing. This allows the input unit to independently adjust the timing at which the input signal is input (input change timing), and allows the output unit to independently adjust the timing at which the output signal is output (output change timing). As a result, the control system can adjust devices more accurately and more precisely.

The output unit may output the output signal based on output instruction data including a designated output timing and a designated output signal value to be output at the designated output timing. This allows output of the output signal independently of the execution period for a task (predetermined period).

The designated output timing may be set as the output change timing, and the designated output signal may be set as the output variable value at the second sampling timing. This allows the output unit to reflect the output change timing adjusted in the input-output timing adjustment unit.

The designated input timing may be the input change timing. This allows the input unit to reflect the input change timing adjusted in the input-output timing adjustment unit.

Advantageous Effects

The control system can easily adjust devices.

BRIEF DESCRIPTION OF THE DRAWINGS

FIG. 1 is a diagram showing the overall configuration of the control system.

FIG. 5 is a diagram showing the configuration of the development support apparatus in detail.

FIG. 6A is a diagram showing the configuration of the input unit and the output unit.

FIG. 12 is a diagram schematically showing a method for adjusting the input and output change timings.

FIG. 13 is a diagram describing a method for reflecting the adjusted input/output change timing in the operation of the control system.

DETAILED DESCRIPTION

Figure 2A:
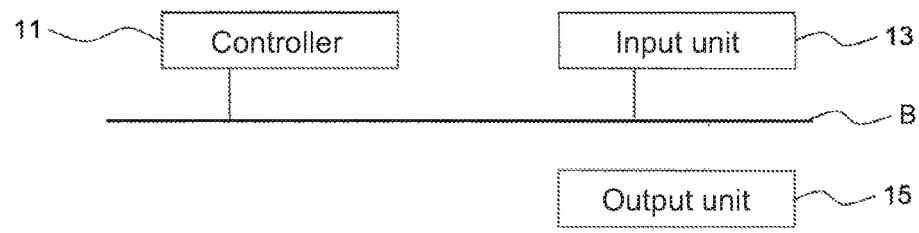
FIG. 2A is a diagram showing an input unit and an output unit arranged on an I/O bus.

1. First Embodiment
(1) Overall Configuration of Control System

The overall configuration of a control system 100 according to a first embodiment will now be described with reference to FIG. 1. FIG. 1 is a diagram showing the overall configuration of the control system. The control system 100 includes a programmable logic controller (PLC) system 1 and a development support apparatus 3.

The PLC system 1 receives a signal input from a signal input unit 5, which is for example including a sensor or a switch. The PLC system 1 executes a program (user program 1131) using an input signal from the signal input unit 5

(described later) as appropriate to calculate an output signal for controlling a control target device 7.

The development support apparatus 3 has various capabilities for creating the user program 1131 (FIG. 4), which is executed in a controller 11 included in the PLC system 1. A single development support apparatus 3 is connectable to the PLC system 1, or any other number of development support apparatuses 3 permitted by the number of addresses assignable to such development support apparatuses 3 may be connected to the PLC system 1.

The PLC system 1, the controller 11, and the development support apparatus 3 will now be described in detail.

(2) PLC System Configuration

The configuration of the PLC system 1 will now be described in detail with reference to FIG. 1. The PLC system 1 according to the present embodiment includes the controller 11, an input unit 13, an output unit 15, and a power supply unit 17.

The controller 11 according to the present embodiment is a central processing unit (CPU) included in a programmable logic controller (PLC). In the controller 11, an input signal input to the input unit 13 (described later) is associated with an input variable used in the controller 11, and an output signal output to the output unit 15 (described later) is associated with an output variable used in the controller 11.

In the controller 11, a predetermined task is repeatedly executed in every predetermined period. A task is a unit of processing including I/O refresh processing for updating an input variable based on an input signal from the input unit 13 and updating an output signal to the output unit 15 based on an output variable, and the processing for executing the user program 1131 and/or a system program 115a (described later).

The user program 1131 executed in the controller 11 yields the above output variable through calculation using the above input variable, and an internal variable as appropriate. As the task is repeatedly executed in every predetermined period, the input signal and the output signal (input and output signals) and variables including the input variable, the output variable, and the internal variable undergo temporal changes.

During execution, the user program 1131 generates output instruction data (described later) using the above output variable. The output instruction data indicates an output signal value to be output by the output unit 15 (described later) and the timing when the output signal value is to be output.

To mainly check whether the currently executed user program is operating appropriately, the controller 11 has the function of tracing temporal changes in the input variable value and the output variable value that are associated with the input and output signals and the internal variable value by sampling and storing such variables (trace function).

The input unit 13 receives a signal input from the signal input unit 5, such as a sensor or a switch, and outputs the input signal to the controller 11. The input unit 13 may be selected in accordance with the type of a signal input from the signal input unit 5. More specifically, when, for example, the signal input unit 5 is a thermocouple for measuring temperature, the input unit 13 may be an input unit for receiving an input signal indicating a voltage generated in the thermocouple. When, for example, the signal input unit 5 includes an electrical switch, the input unit 13 may be an input unit for receiving an input signal indicating the on or off state of the electrical switch.

The input unit 13 has the function of sampling the input signal in addition to receiving an input signal. The input unit 13 can thus sample temporal changes in an actual input signal. The configuration of the input unit 13 will be described in detail later.

The input unit 13 can further receive an input signal at a designated timing (designated input timing). The input unit 13 can thus receive an input signal independently of the execution period for a task (predetermined period).

The output unit 15 outputs an output signal associated with an output variable used in the controller 11 to the corresponding control target device 7. The controller 11 can thus control the control target device 7 based on an output variable calculated by executing a program.

The output unit 15 outputs an output signal having a designated signal value (designated output signal value) at a designated timing (designated output timing), which are included in the output instruction data transmitted from the controller 11. The output unit 15 can thus output an output signal independently of the execution period for a task (predetermined period).

The output unit 15 may be selected in accordance with the type of an output signal. When, for example, the control target device 7 is a motor whose position control is to be performed, an output unit with a motion controller function may be used. When, for example, the control target device 7 is an electric furnace, an output unit may output a signal for controlling a relay that controls the electric furnace (e.g., a signal for controlling the on/off duty ratio).

The output unit 15 may further have the function of sampling an output signal in addition to outputting an output signal, like the input unit 13. The output unit 15 can thus sample temporal changes in an actual output signal. The configuration of the output unit 15 will be described in detail later.

The power supply unit 17 supplies power to the controller 11, the input unit 13, and the output unit 15.

The PLC system 1 may have all these components accommodated in a single housing, or may have the components accommodated in separate housings and connected to one another. In particular, the PLC system 1 including the input unit 13 and the output unit 15 as separate components allows intended numbers of intended control target devices and signal input units to be connected to the system.

As shown in FIG. 2A, the input unit 13 and the output unit 15 in the PLC system 1 may be arranged on an I/O bus B included in the controller 11 in a manner communicable with the controller 11. FIG. 2A is a diagram showing the input unit and the output unit arranged on the I/O bus.

Figure 2B:
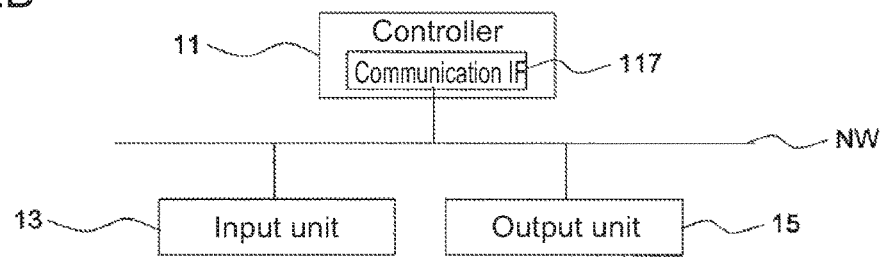
FIG. 2B is a diagram showing an input unit and an output unit connected to a controller with a communication network.

As shown in FIG. 2B, the input unit 13 and the output unit 15 may be connected to the controller 11 with a communication network NM in a manner communicable with the controller 11 via a communication interface 117 (described later) included in the controller 11. FIG. 2B is a diagram showing the input unit 13 and the output unit 15 connected to the controller with the communication network.

(3) Configuration of Controller

Figure 3:
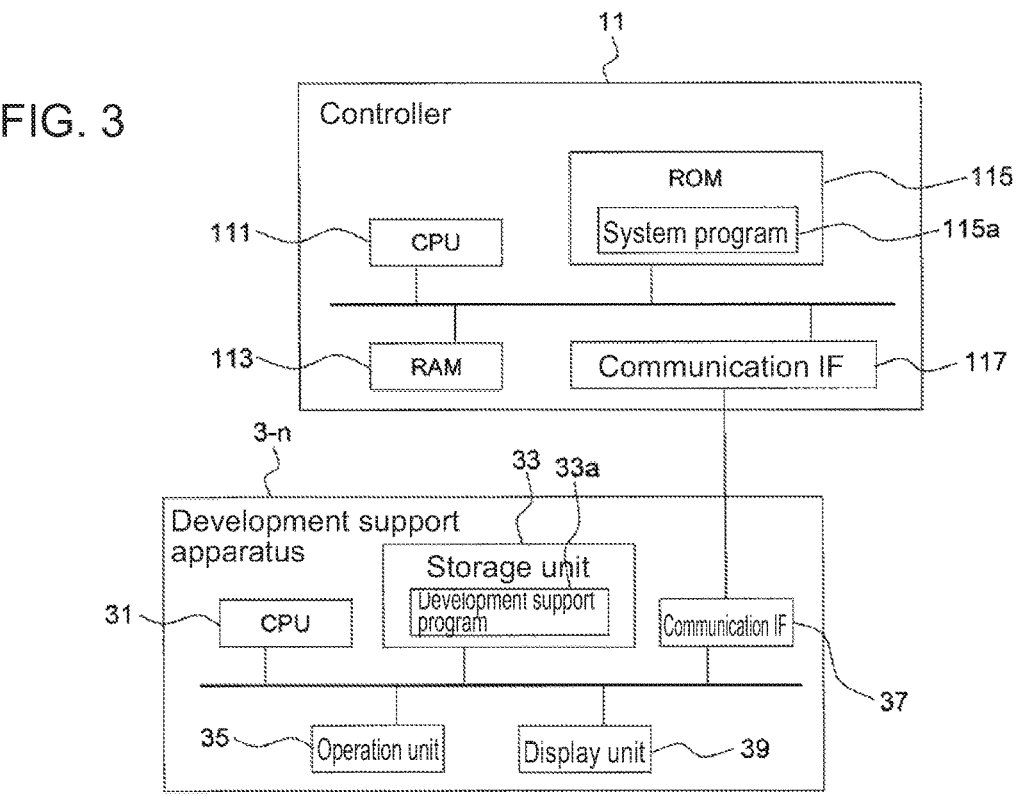
FIG. 3 is a diagram showing the configuration of the controller and a development support apparatus.
Figure 4:
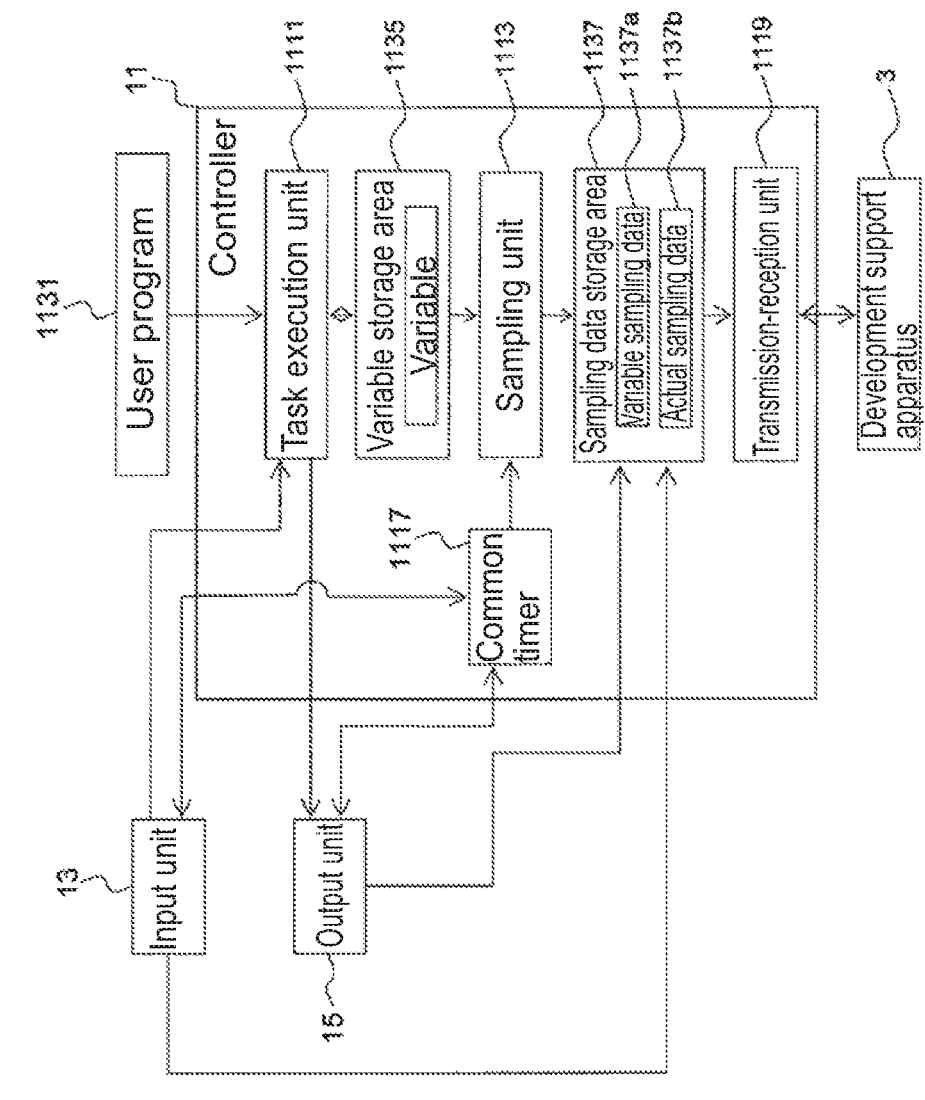
FIG. 4 is a diagram showing the configuration of the controller in detail.

The configuration of the controller 11 will now be described in detail with reference to FIGS. 3 and 4. FIG. 3 is a diagram showing the configuration of the controller and the development support apparatus. FIG. 4 is a diagram showing the configuration of the controller in detail.

As described above, the controller 11 is the CPU of the PLC system. As shown in FIG. 3, the controller 11 includes a CPU 111, which is responsible for computational processing such as program execution, a random access memory (RAM) 113, which provides a writable and readable storage area, a read-only memory (ROM) 115, which mainly provides a read-only storage area, and a communication interface 117 through which communication is performed with the development support apparatus 3 and/or with the input unit 13 and the output unit 15.

The communication interface 117 allows data transmission and reception based on a data communication protocol such as TCP/IP (Transmission Control Protocol/Internet Protocol).

The components of the controller 11 implementing its various functions will now be described in more detail with reference to FIG. 4. In the present embodiment, the functions of the components of the controller 11 are implemented by the CPU 111 of the controller 11 shown in FIG. 3 executing the system program 115*a* stored in the ROM 115.

As shown in FIG. 4, the controller 11 includes a task execution unit 1111, a sampling unit 1113, a common timer 1117, and a transmission-reception unit 1119.

The task execution unit 1111 refers to the user program 1131 stored in the RAM 113 and repeatedly executes a predetermined task including execution of the user program 1131 and the I/O refresh processing described above in every predetermined period.

During the I/O refresh processing, input signal data 135*a* (described later) (or output signal data 155*a* in some cases) obtained through sampling performed in the input unit 13 (or the output unit 15 in some cases) is transmitted from the input unit 13 (and the output unit 15) to the controller 11.

The task execution unit 1111 executes a task to store an input variable value that is associated with an input signal based on an input signal from the input unit 13, an output variable value that is associated with an output signal calculated by executing the user program 1131, and an internal variable value that is used in the user program 1131 as appropriate into a variable storage area 1135, which is a part of the storage area of the RAM 113 assigned to these signals.

More specifically, the above task is repeatedly executed in every predetermined period. When an input variable is updated based on an input signal from the input unit 13, and/or when an output variable and/or an internal variable are updated by executing the user program 1131, the updated variables are stored into the variable storage area 1135.

When the user program 1131 is executed by the task execution unit 1111, the user program 1131 calculates the designated output timing and the designated output signal value based on an output variable value stored in the variable storage area 1135, and generates output instruction data. The user program 1131 then transmits the generated output instruction data to the output unit 15.

The user program 1131 generates output instruction data in accordance with the type of the output unit 15. The output instruction data for a high-speed output unit 15 (described later) is generated in the manner described below. For example, the designated output timing is set as the time obtained by dividing the execution period for a task (predetermined period) by a predetermined number. When, for example, the predetermined period is divided by n, the first designated output timing is the predetermined period divided by n, the next designated output timing is the value (predetermined period divided by n) multiplied by 2, . . . . The calculations yield n designated output timings.

A designated output signal value at each designated output timing can be calculated by performing linear interpolation between an output variable value obtained during execution of the previous task and an output variable value obtained during execution of the current task.

The output instruction data to be used by a time instruction output unit 15 (described later) can be generated by, for example, setting the output variable value obtained during execution of the current task as the designated output signal value, and setting the timing at which the designated output signal value is to be output as the designated output timing.

When the input unit 13 can receive an input signal at a designated timing (designated input timing), the user program 1131 calculates the designated input timing and transmits the calculated time to the input unit 13. The user program 1131 calculates the designated input timing in accordance with the type of the input unit 13.

The designated input timing to be used by a high-speed input unit 13 (described later) and a high-speed sampling input unit 13 (described later) is set as the time obtained by dividing the execution period for a task (predetermined period) by a predetermined number. When, for example, the predetermined period is divided by n, the first designated input timing is the predetermined period divided by n, the next designated input timing is the value (predetermined period divided by n) multiplied by 2, . . . . The calculations yield n designated input timings.

The designated input instruction time to be used by a time instruction input unit 13 (described later) is set as the timing at which an input signal is to be input.

For a change timing obtaining unit 13 (described later), the timing of a change in an input signal value to be obtained is set as the designated input timing.

The sampling unit 1113 samples the input variable, the output variable, and/or the internal variable at a second timing. The sampling unit 1113 associates the value(s) of the sampled variable(s), or the second sampling value(s) with the second sampling timing, which is the sampling timing for the input variable, the output variable, and/or the internal variable, and stores the second sampling value(s) and the sampling timing of the variables, which is the second sampling timing, into a variable sampling data 1137*a*.

More specifically, the sampling unit 1113 obtains the values of the input variable, the output variable, and/or the internal variable stored in the variable storage area 1135 at the second timing, and sets the sampled value(s) as the second sampling value(s). The sampling unit 1113 then sets the timing at which the above variable values are obtained from the variable storage area 1135 as the second sampling timing. The sampling unit 1113 sets, as the above second sampling timing, a common timing obtained by the common timer 1117 (described later) when the variables are sampled. This enables more accurate comparison between the temporal changes in the input and output signals and the temporal changes in the above variables.

Subsequently, the sampling unit 1113 associates the obtained second sampling value(s) with the second sampling timing, and stores the value(s) and the sampling timing into a sampling data storage area 1137 included in the RAM 113. The sampling unit 1113 repeats the above operation to obtain the variable sampling data 1137*a* including time series data for the second sampling timing and the sampling value sequence of second sampling values.

In the present embodiment, the above second timing occurs in every predetermined period for executing a task. The second timing may not be this timing, and may be, for example, any intended timing such as the timing at which a predetermined trigger occurs or the designated timing in the user program 1131.

The sampling unit 1113 stores, as actual sampling data 1137*b*, the input signal data 135*a* (output signal data 155*a*) transmitted from the input unit 13 (output unit 15) into the sampling data storage area 1137 when the I/O refresh processing is performed.

The common timer 1117 obtains the common timing. As described later, the input unit 13 also includes a common timer 133, and the output unit 15 also includes a common timer 153 (FIG. 6A). The common timers 133 and 153 have the same function as the common timer 1117. The common timer 1117 included in the controller 11, the common timer 133 (FIG. 6A) included in the input unit 13, and the common timer 153 (FIG. 6A) included in the output unit are synchronous with one another. The controller 11, the input unit 13, and the output unit 15 share the same timing (common timing). This reduces differences between the timing obtained in the controller 11, the timing obtained in the input unit 13, and the timing obtained in the output unit 15.

The transmission-reception unit 1119 transmits and receives data to and from the development support apparatus 3 through the communication interface 117. When the input unit 13 and the output unit 15 are connected to the controller 11 with a communication network NW, the transmission-reception unit 1119 also transmits and receives data to and from the input unit 13 and the output unit 15.

The controller 11 according to the present embodiment including the components described above can sample the input variable associated with the input signal and the output variable associated with the output signal, which are used internally in the controller 11, and the internal variable used in the user program 1131 at the second timing. The controller 11 obtains the actual sampling data 1137b and thus can internally store the sampling results of the input signal and the output signal in the input unit 13 and the output unit 15. The controller 11 can thus output the actual sampling data 1137b to the development support apparatus 3.

(4) Configuration of Development Support Apparatus

I. Overall Configuration

The configuration of the development support apparatus 3 will now be described in detail with reference to FIGS. 3 and 5. FIG. 5 is a diagram showing the configuration of the development support apparatus in detail.

The development support apparatus 3 is, for example, a computer such as a personal computer. As shown in FIG. 3, the development support apparatus 3 includes a CPU 31, which is responsible for computational processing such as program execution, a storage unit 33, which provides a storage area, an operation unit 35, which includes input devices such as a keyboard and a mouse, a communication interface 37, which allows communications with the controller 11, and a display unit 39, which displays, for example, the results of tracing.

The configuration of the development support apparatus 3 will now be described in detail with reference to FIG. 5. The functions of the components of the development support apparatus 3 are implemented by the CPU 31 in the development support apparatus 3 shown in FIG. 2 executing a development support program 33a stored in the storage unit 33.

As shown in FIG. 5, the development support apparatus 3 includes a sampling data reception unit 311, a same time-series data generation unit 313, and a same time-series data display unit 315.

The sampling data reception unit 311 receives the variable sampling data 1137a and the actual sampling data 1137b stored in the sampling data storage area 1137 from the controller 11, which is connected to the communication interface 37, and stores the data into the storage unit 33 included in the development support apparatus 3.

The same time-series data generation unit 313 generates data in the same time series (same time-series data). The same time-series data includes the sampling value contained in the variable sampling data 1137a, the first sampling value contained in the actual sampling data 1137b, and the designated output signal value contained in the output instruction data (or the sampling output signal values in the actual sampling data 1137b) that are rearranged in the same time series. More specifically, the same time-series data includes the first sampling value (described later), the second sampling value, and the designated output signal value (or sampling output signal value) associated with the timings in the same time series corresponding to the first sampling timing (described later), the second sampling timing, and the designated output timing (or the output sampling timing), which are arranged in the same time series.

As described above, the actual sampling data 1137b, the variable sampling data 1137a, and the output instruction data are arranged in the same time series to generate the single set of same time-series data.

The same time-series data display unit 315 displays the same time-series data on the same time axis. More specifically, the same time-series data display unit 315 displays the same time-series data in a graph having the time-sampling value coordinates. This allows checking of the relationship between the above sampling result and the designated output signal value on the same time axis without performing the procedure for aligning individual data pieces (the actual sampling data 1137b, the variable sampling data 1137a, and the output instruction data). This allows easy adjustment of devices included in the control system 100 without placing a large burden on, for example, a system developer.

(5) Configuration of Input Unit and Output Unit

Figure 6B:
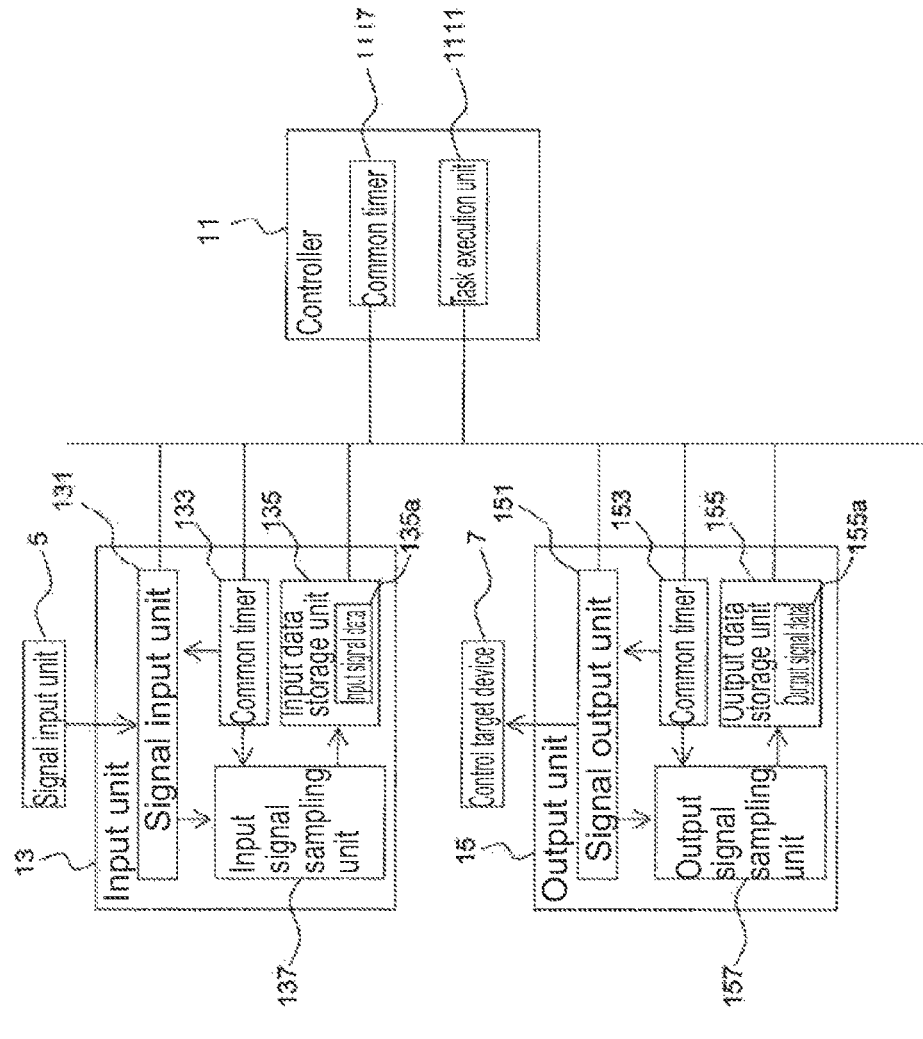
FIG. 6B is a diagram showing the configuration of the input unit and the output unit having the sampling function.

The configuration of the input unit 13 and the output unit 15 in the PLC system 1 will now be described with reference to FIGS. 6A and 6B. FIG. 6A is a diagram showing the configuration of the input unit 13 and the output unit 15. FIG. 6B is a diagram showing the configuration of the input unit 13 and the output unit having the sampling function.

I. Configuration of Input Unit

The configuration of the input unit 13 will be described first. The input unit 13 includes a signal input unit 131, the common timer 133, an input data storage unit 135, and an input signal sampling unit 137.

The signal input unit 131 is connected to the signal input unit 5, and receives an input signal from the signal input unit 5. The signal input unit 131 transmits the received input signal to the controller 11 when the I/O refresh processing is performed in the task execution unit 1111 included in the controller 11. This structure allows the controller 11 to reflect the value of the received input signal in the input variable when the I/O refresh processing is performed.

The signal input unit 131 can receive an input signal at a designated input timing. In this state, an input signal can be input independently of the execution period for a task (predetermined period). The signal input unit 131 can receive an input signal at the timing designated with any of the two methods described below.

The first method is to receive an input signal at a designated input timing that is determined by a high-speed input period shorter than the predetermined period. This method enables input of an input signal in a period shorter than the execution period for a task. An input unit for receiving an input signal with this method is referred to as a high-speed input unit.

The second method is to set a predetermined timing as a designated input timing. This method enables input of an input signal at any designated timing. An input unit for receiving an input signal with this method is referred to as a timing designation input unit. This method enables input of an input signal in a period shorter than the execution period for a task, independently of the execution period (predetermined period) for a task.

The common timer 133 obtains the common timing. The common timer 133 is synchronous with the common timer 1117 included in the controller 11 and with the common timer 153 (described later) included in the output unit. The controller 11, the input unit 13, and the output unit 15 can share the same timing (common timing).

The input data storage unit 135 stores the input signal data 135a. The input signal data 135a stored in the input data storage unit 135 is transmitted to the controller 11 when the I/O refresh processing is performed.

The input signal sampling unit 137 samples the input signal at an input signal reception timing (an example of a first timing), and sets the sampled input signal value as an input signal sampling value (an example of a first sampling value). The input signal sampling unit 137 also sets the timing at which the input signal sampling value is sampled as an input signal sampling timing (an example of a first sampling timing). The input signal sampling timing is the common timing obtained by the common timer 133.

The input signal sampling unit 137 further transmits the input signal sampling value and the input signal sampling timing to the input data storage unit 135. The transmitted input signal sampling value and the transmitted input signal sampling timing are associated with each other in the input signal data 135a.

The input signal sampling unit 137 samples the input signal with any of the two methods described below.

The first method (high-speed sampling method) is to sample an input signal sampling value in every period shorter than the predetermined period for executing a task (high-speed sampling period), and to set the timing determined by the high-speed sampling period as the input signal sampling timing. An input unit for sampling an input signal in every period shorter than the predetermined period is referred to as a high-speed sampling input unit.

The second method is to set the timing at which the input signal undergoes a predetermined change as the input signal reception timing, and to set the signal value of the input signal after the predetermined change as the input signal sampling value, and the timing determined by the input signal sampling value at which the input signal undergoes the predetermined change as the input signal sampling timing (change time obtaining sampling method). An input unit for sampling the timing at which the input signal undergoes the predetermined change and sampling the value of the input signal after the predetermined change is referred to as a change timing obtaining input unit.

The above high-speed sampling input unit 13 samples the input signal more accurately in a period shorter than the predetermined period, which is the execution period for a task.

The change timing obtaining input unit 13 samples the input signal to accurately sample the timing at which the input signal undergoes the predetermined change together with the input signal value at the timing of change, independently of the execution period for a task (predetermined period).

II. Configuration of Output Unit

The configuration of the output unit 15 will now be described. The output unit 15 includes a signal output unit 151 and the common timer 153.

The signal output unit 151 outputs an output signal to the control target device 7 based on the above output variable when the I/O refresh processing is performed in the task execution unit 1111 included in the controller 11. In the present embodiment, the signal output unit 151 outputs an output signal based on output instruction data generated based on the above output signal, which is transmitted from the controller 11 when the I/O refresh processing is performed. In the present embodiment, the output signal is output with any of the two methods described below.

The first method is to output an output signal at the designated output timing determined by a high-speed output period shorter than the predetermined period, and to output a signal value in every high-speed output period as the designated output signal value. An output unit for outputting an output signal with this method is referred to as a high-speed output unit.

The second method is to output an output signal at the designated output timing as the predetermined timing and to output the signal value at a predetermined timing as the designated output signal value. An output unit for outputting an output signal with this method is referred to as a timing designation output unit.

The high-speed output unit 15 outputs the output signal, which is controlled more precisely in a period shorter than the predetermined period, independently of the execution period for a task (predetermined period).

The timing designation output unit 15 outputs the output signal. This allows output of the output signal with any signal value at a predetermined timing independently of the execution period for a task (predetermined period).

The common timer 153 has the structure corresponding to the structure of the common timer 133 included in the input unit 13, and thus will not be described.

The output unit 15 in the present embodiment does not have the sampling function. In one modification, the output unit 15 may have the sampling function as shown in FIG. 6B.

In this case, the output unit 15 further includes an output data storage unit 155 and an output signal sampling unit 157. The output data storage unit 155 stores output signal data 155a. The output signal data 155a stored in the output data storage unit 155 is transmitted to the controller 11 when the I/O refresh processing is performed.

The output signal sampling unit 157 samples an output signal at a predetermined timing, and sets the sampled output signal as a sampling output signal value. The output signal sampling unit 157 sets, as an output sampling timing, the timing at which the sampling output signal value is sampled, which is determined by the predetermined timing.

The output signal sampling unit 157 further transmits the sampling output signal value and the output sampling timing to the output data storage unit 155. The transmitted sampling output signal value and the transmitted output sampling timing are associated with each other in output signal data 155a.

Like the input unit 13, the output unit 15 may also be the high-speed sampling output unit 15 or the change time obtaining output unit 15.

The input unit 13 and the output unit 15 with the above structures can sample the input signal and the output signal, and can sample the timings at which the input and output signals are sampled.

(6) Data Sampling Operation Performed by Control System

Figure 7:
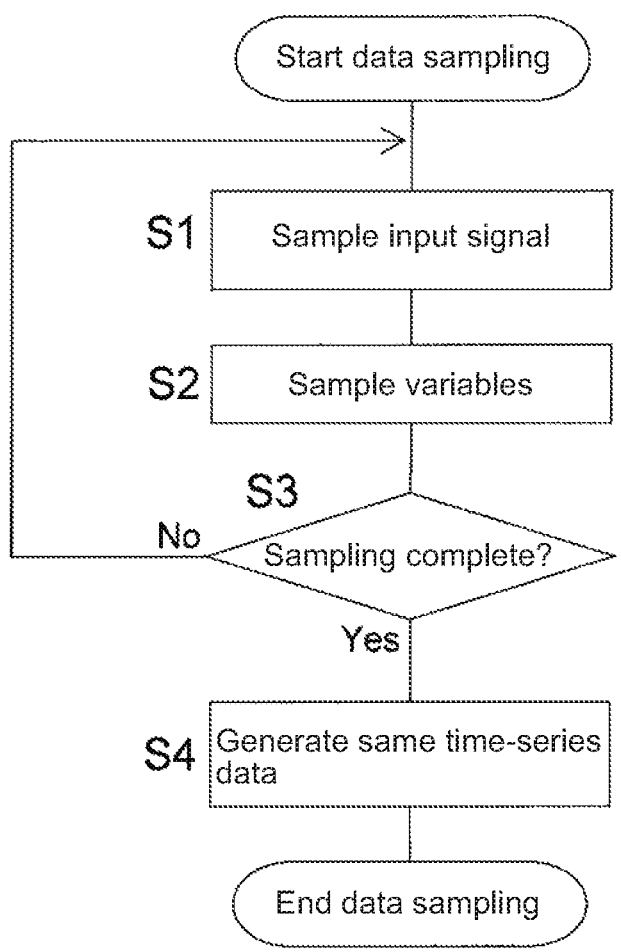
FIG. 7 is a flowchart showing a data sampling operation performed by the control system.

A data sampling operation performed by the control system 100 according to the present embodiment will now be described. FIG. 7 is a flowchart showing the data sampling operation performed by the control system.

When the control system 100 starts sampling data, the input signal sampling unit 137 in the input unit 13 first samples the input signal (step S1).

The input unit 13 samples the input signal with the high-speed sampling method and/or the change time obtaining sampling method described above. When the system includes a plurality of input units 13, the input units 13 may sample input signals in different sampling periods (at different timings).

For example, the signal input unit 5 with a slow change or with a slow response may sample its input signal in every longer sampling period, whereas the signal input unit 5 with a quick change or with a quick response may sample its input signal in every shorter sampling period.

This system can avoid obtaining all input signals in short sampling periods, and prevents the operational load of the input unit 13 from increasing unnecessarily.

In the controller 11, the sampling unit 1113 samples the input variable value, the output variable value, and/or the output variable stored in the variable storage area 1135 (step S2). In the illustrated example, the sampling unit 1113 samples these variables in every predetermined period for executing a task. The controller 11 uses output instruction data that is generated by the user program 1131 as sampling data for the sampling value of the output signal.

When the output unit 15 has the sampling function as in the modification shown in FIG. 6B, the sampling data obtained with the sampling function (output signal data 155a) may be set as the sampling data for the sampling value of the output signal.

The sampling unit 1113 further stores the input signal data 135a (output signal data 155a) transmitted when the I/O refresh processing is performed into the sampling data storage area 1137 as the actual sampling data 1137b. In this manner, the sampling data for the input signal (output signal) is obtained.

Subsequently, the controller 11 determines whether the sampling is complete (step S3). To determine whether the sampling is complete, the controller 11 may determine, for example, whether a predetermined sampling time has passed after the sampling is started.

When determining that the sampling is not complete (No in step S3), the controller 11 returns to the processing in step S1, and continues the data sampling.

When determining that the sampling is complete (Yes in step S3), the controller 11 advances to the processing in step S4 (generation of same time-series data).

After the variable sampling data 1137a and the actual sampling data 1137b are generated, the same time-series data is generated (step S4). More specifically, the variable sampling data 1137a, the actual sampling data 1137b, and the output instruction data, which are stored in the sampling data storage area 1137, are first transmitted to the development support apparatus 3 through the transmission-reception unit 1119.

When the variable sampling data 1137a and the actual sampling data 1137b (and the output instruction data as appropriate) are received, the same time-series data generation unit 313 included in the development support apparatus 3 generates the same time-series data. More specifically, the same time-series data generation unit 313 first arranges, in the same time series, the input signal sampling timing (first sampling timing) contained in the actual sampling data 1137b, the second sampling timing, and the designated output timing (or the output sampling timing contained in the actual sampling data 1137b). In other words, the same time-series data generation unit 313 rearranges the input signal sampling timing, the second sampling timing, and the designated output timing (or the output sampling timing) chronologically to generate time data in the same time series.

Subsequently, the same time-series data generation unit 313 stores the chronologically rearranged input signal sampling timing, second sampling timing, and designated output timing (or output sampling timing) in a manner associated with the sampling value and the designated output signal value corresponding to the actual sampling data 1137b, the variable sampling data 1137a, and the output instruction data. This aligns the actual sampling data 1137b, the variable sampling data 1137a, and the output instruction data in the same time series to generate the same time-series data.

The same time-series data generated through steps S1 to S4 described above can be displayed by the same time-series data display unit 315 as appropriate.

Figure 8:
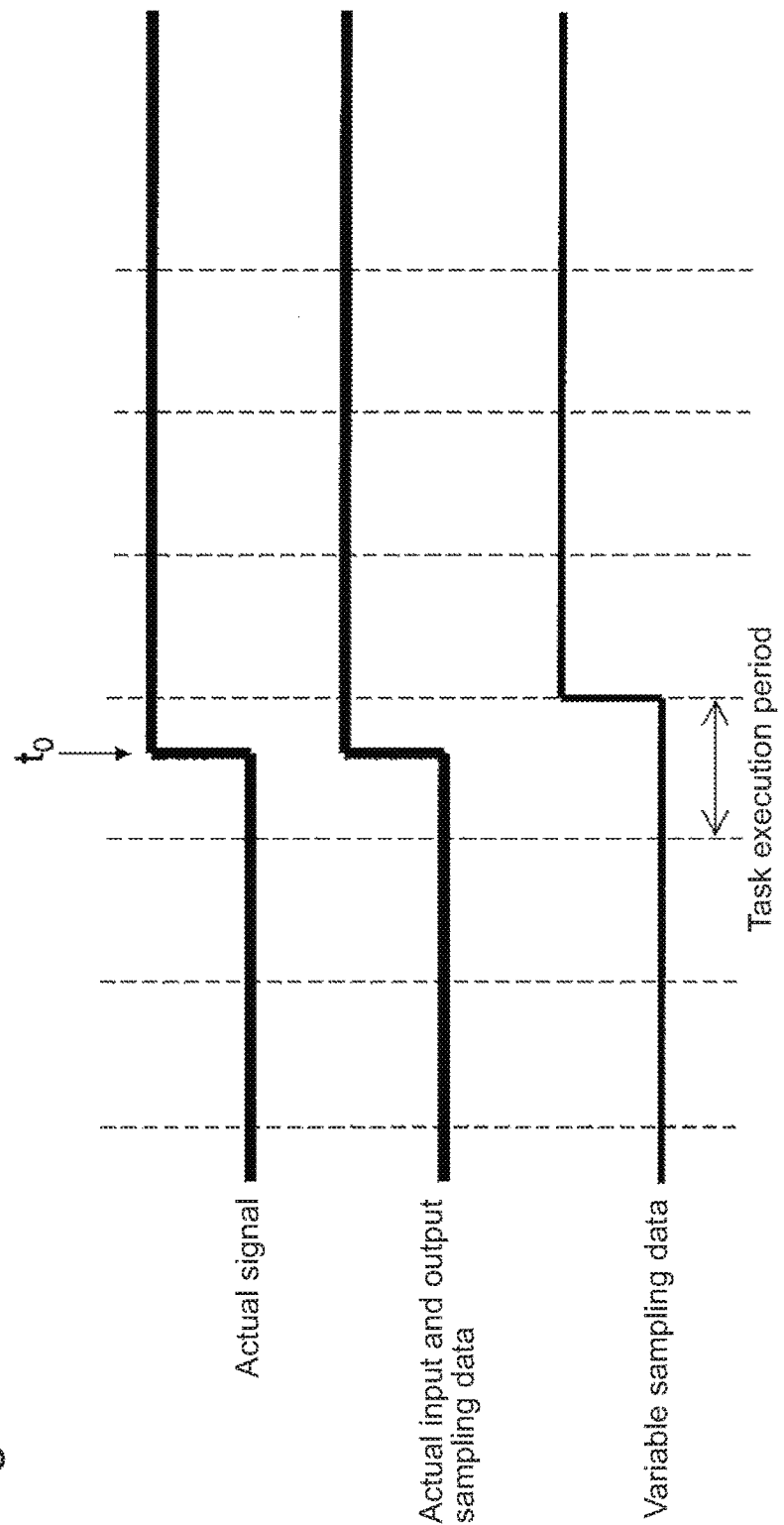
FIG. 8 is an example display of the same time-series data on the same time axis.

In the example shown in FIG. 8, the signal value of the actual sampling data changes from 0 to 1 at time $t_0$ when the actual signal value changes from 0 to 1 at time $t_0$. The value of the variable (input variable) associated with the above actual signal changes from 0 to 1 when the task execution period following time to is started.

FIG. 8 is an example display of the same time-series data on the same time axis.

In this manner, the same time-series data displayed on the same time axis allows checking of the relationship between the above sampling result and the designated output signal value on the same time axis, without performing the procedure for aligning individual data pieces. This allows easy adjustment of devices without placing a large burden on, for example, a system developer.

2. Second Embodiment

In the control system 100 according to the first embodiment, the input unit 13 obtains the sampling timing and the sampling value of an input signal to check temporal changes in the actual input signal.

Figure 9:
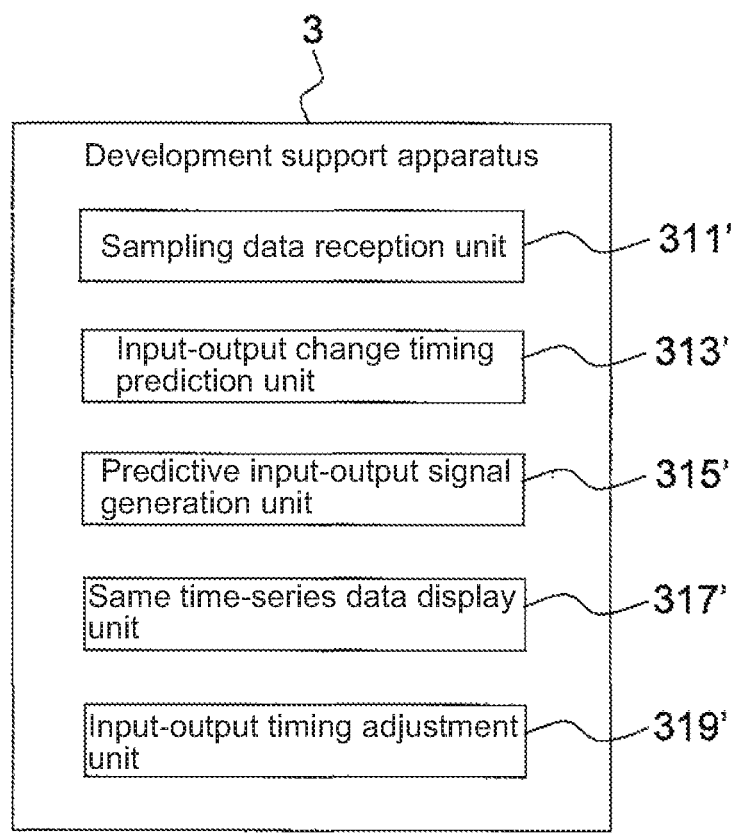
FIG. 9 is a diagram showing the configuration of the development support apparatus included in the control system according to the second embodiment in detail.

However, the embodiments are not limited to this structure. A control system 200 according to a second embodiment predicts an actual input signal and an actual output signal without obtaining the actual input signal and the actual output signal. The control system 200 according to the second embodiment will now be described. The components of the control system 200 according to the second embodiment except the development support apparatus 3 are the same as the corresponding components of the control system 100 according to the first embodiment, and thus will not be described. The configuration of the development support apparatus 3 will be described with reference to FIG. 9. FIG. 9 is a diagram showing the configuration of the development support apparatus included in the control system according to the second embodiment in detail.

The input unit 13 and the output unit 15 may include or may not include the components responsible for sampling of an input signal and an output signal described in the first embodiment (the input signal sampling unit 137, the output signal sampling unit 157, the input data storage unit 135, and the output data storage unit 155).

As shown in FIG. 9, the development support apparatus 3 according to the second embodiment includes a sampling data reception unit 311', an input-output change timing prediction unit 313', a predictive input-output signal generation unit 315', a same time-series data display unit 317', and an input-output timing adjustment unit 319'.

The sampling data reception unit 311' receives variable sampling data 1137a stored in a sampling data storage area 1137 from a controller 11 connected to a communication interface 37, and stores the data into a storage unit 33 included in the development support apparatus 3.

The input-output change timing prediction unit 313' predicts an input change timing and/or an output change timing based on the connection between the input unit and/or the output unit with the controller, the communication speed, and the second sampling timing. The input change timing is the timing at which the signal value of an input signal changes to a value corresponding to an input variable value at the second sampling timing. The output change timing is the timing at which the signal value of an output signal changes to a value corresponding to an output variable value at the second sampling timing.

The input-output change timing prediction unit 313' calculates a communication delay between the controller 11, and the input unit 13, and the output unit 15 based on the connection between the input unit and/or the output unit with the controller and the communication speed. The input-output change timing prediction unit 313' further calculates the input change timing and the output change timing to reflect the operation time taken to perform a predetermined operation by the input unit 13 and/or the output unit 15.

When, for example, an input signal is sampled for a predetermined sampling time by the input unit 13, the sampling of an input signal is predicted to start at the timing temporally preceding the reception timing of a signal carrying a request for the input signal data 135a by the sampling time and also the operation time taken by the input unit 13 to generate the input signal data 135a. To allow the input unit 13 to receive the request signal for the input signal data 135a at a predetermined timing (transmission request signal reception timing), the controller 11 needs to transmit the transmission request signal at the timing (corresponding to the second sampling timing) earlier than the transmission request signal reception timing by a communication delay time.

The above structure allows prediction of the input change timing and the output change timing reflecting a communication delay between the controller 11, the input unit 13, and/or the output unit 15 (determined by the connection between the controller 11 and the input unit 13 and/or the output unit 15 and by the communication speed) and the operation time taken by the input unit 13 and/or the output unit 15.

Figure 10:
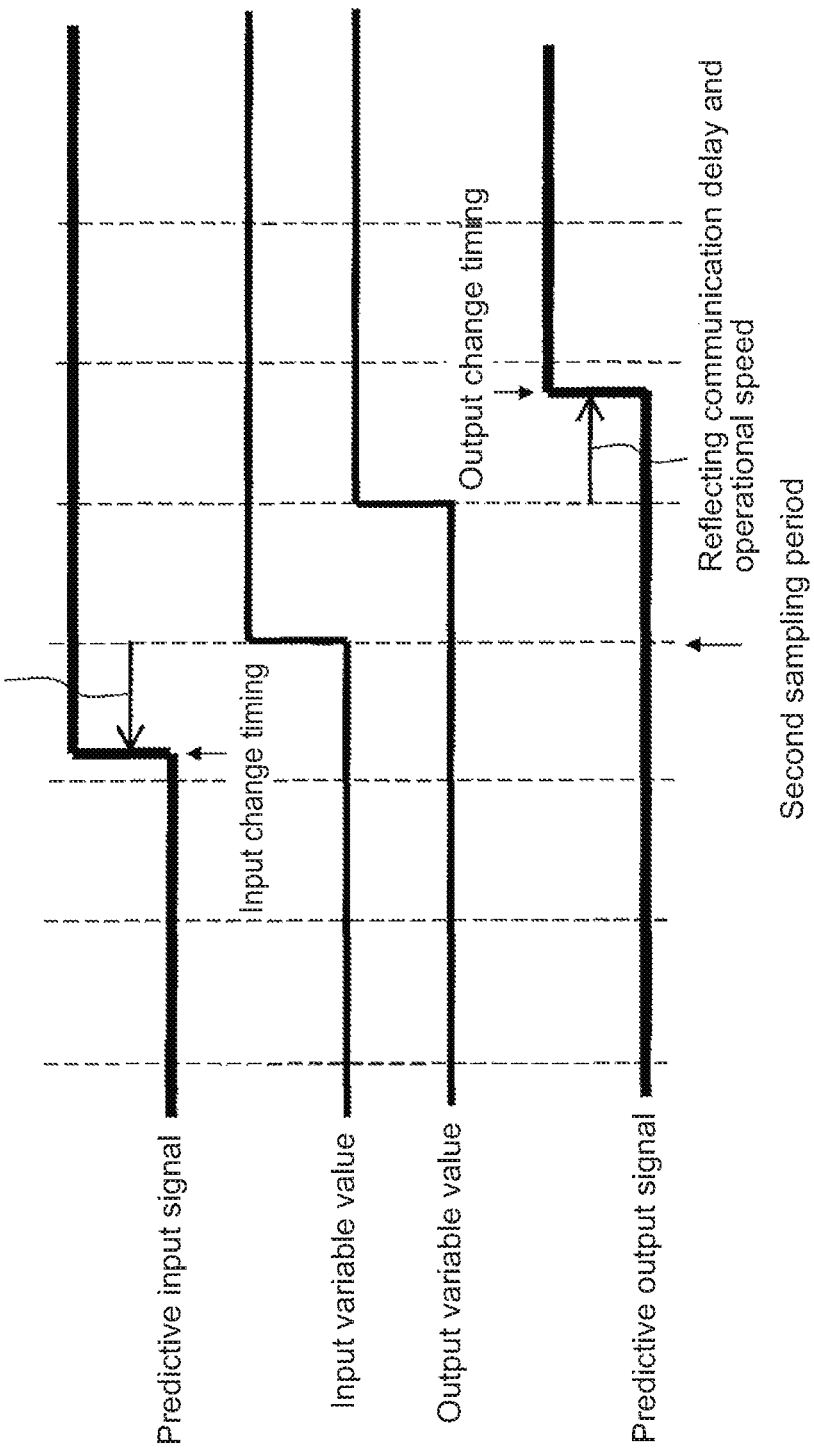
FIG. 10 is a diagram schematically showing generation of predictive input and output signals.

The predictive input-output signal generation unit 315' generates predictive input and output signal data. The predictive input signal data is generated by associating the value of an input variable at the second sampling timing with the input change timing. More specifically, for example, the predictive input-output signal generation unit 315' temporally shifts the timing for the variable sampling data 1137a forward by the communication delay as well as by the operation time to set the second sampling timing equal to the input change timing as shown in FIG. 10.

The predictive output signal data is generated by associating the value of an output variable at the second sampling timing with the output change timing. More specifically, for example, the predictive input-output signal generation unit 315' temporally shifts the timing to obtain the variable sampling data 1137a backward by the communication delay as well as by the operation time to set the second sampling timing equal to the output change timing. FIG. 10 is a diagram schematically showing generation of such predictive input and output signals.

The predictive input-output signal generation unit 315' generates the predictive input signal data and/or the predictive output signal data using the input change timing and/or the output change timing predicted by the predictive input-output change timing prediction unit 313'. This allows prediction of an actual input signal input into the input unit and/or an actual output signal output from the output unit based on the variables used in the controller 11 without sampling the input signal and the output signal.

The same time-series data display unit 317' displays the variable sampling data 1137a, and the predictive input signal data and/or the predictive output signal data on the same time axis. This allows checking of the relationship between the sampling results of the variables and the predicted input signal and/or the predicted output signal on the same time axis, without performing the procedure for aligning individual data pieces. This allows easy adjustment of devices without placing a large burden on, for example, a system developer.

Figure 11:
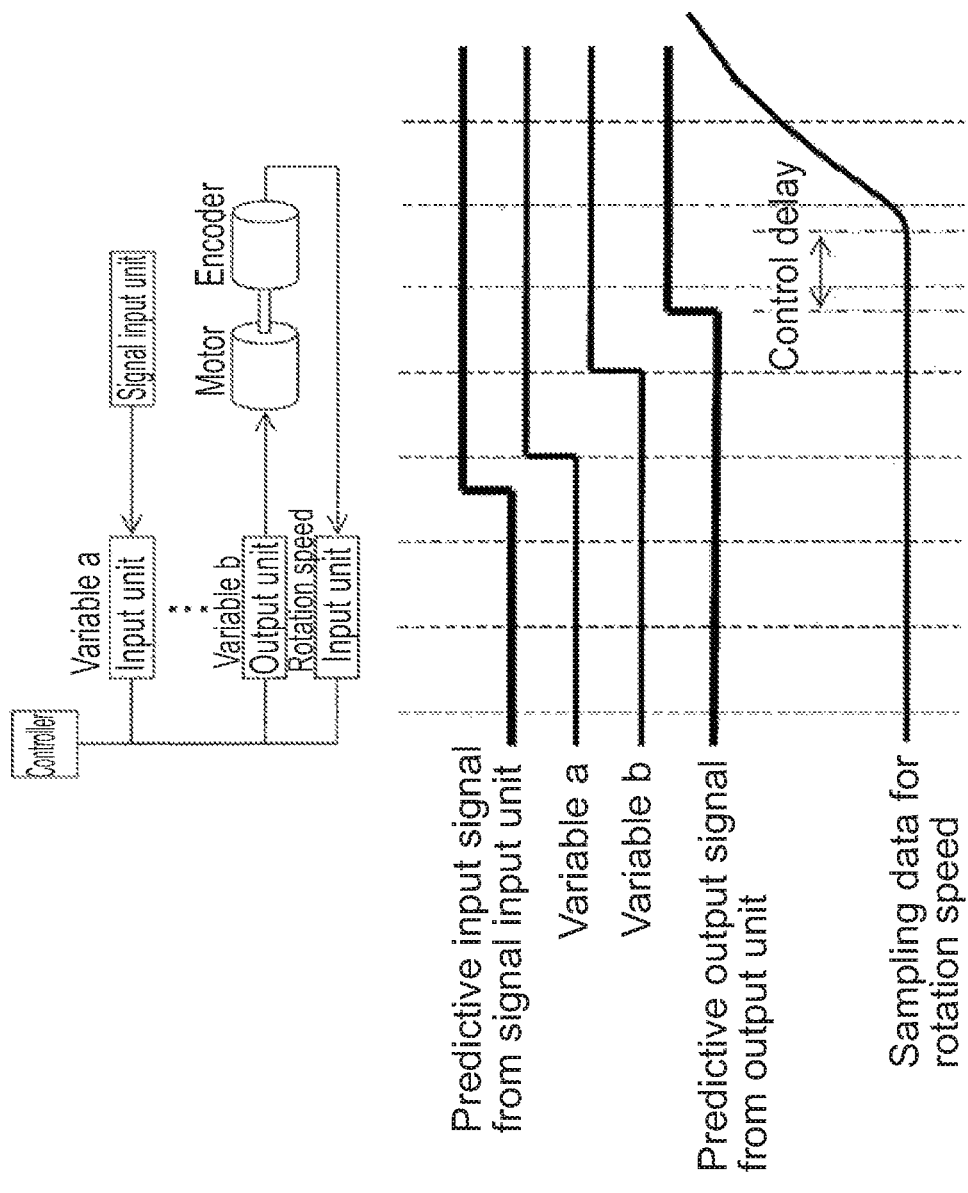
FIG. 11 is a diagram showing a predictive input signal and a predictive input signal displayed on the same time axis.

In the example shown in FIG. 11, an input variable a is associated in the input unit 13 connected to the signal input unit 5, and an output variable b is associated in the output unit 15 connected to a motor (control target device 7), and the rotation speed is sampled based on an encoder input signal input from an encoder connected to the rotating shaft of a motor. FIG. 11 is a diagram showing a predictive input signal and a predictive input signal displayed on the same time axis.

The sampling data for the input variable a and the output variable b, the sampling data for the input signal, and the predictive input signal data and/or the predictive output signal data are displayed on the same time axis to allow visual checking of, for example, the response time (control delay) taken by the control target device to respond to the output signal from the output unit 15, changes in the variable values, the output signal timing, and the response time taken by the control target device to respond to the input signal from the signal input unit 5.

The above pieces of data displayed on the same time axis further allow easy adjustment of the input change timing and/or the output change timing as described later.

The input-output timing adjustment unit 319' adjusts the input change timing and/or the output change timing. More specifically, as shown in FIG. 12, the input-output timing adjustment unit 319' shifts the signal change timing of a predictive input signal to a timing before the signal change timing of the predictive input signal, or shifts the signal change timing of a predictive output signal to a timing after the signal change timing of the predictive output signal. This allows the input unit 13 to independently adjust the timing at which an input signal is input (input change timing), and allows the output unit 15 to independently adjust the timing at which an output signal is output (output change timing). As a result, the control system can adjust devices more accurately and more precisely. FIG. 12 is a diagram schematically showing a method for adjusting the input and output change timings.

The signal change timing may be adjusted in the input-output timing adjustment unit 319' by displaying the predictive input signal data and/or the predictive output signal data, and the variable sampling data 1137a on the same time axis in the same time-series data display unit 317'. When the predictive input signal data and/or the predictive output signal data, and the variable sampling data 1137a are displayed on the same time axis in the same time-series data display unit 317', the permissible ranges for adjusting the input and output change timings may be displayed (FIG. 12). This allows visual determination of the permissible ranges for adjusting the input and output change timings.

To allow the control system 200 to perform the operation reflecting the input change timing and/or the output change timing adjusted in the above input-output timing adjustment unit 319' (the adjusted input change timing and/or the adjusted output change timing), the control system 200 includes a timing designation input unit 13 and a timing designation output unit 15, which function as the input unit 13 and the output unit 15.

In the example described below with reference to FIG. 13, a predetermined output signal is output at the output change timing using the timing designation output unit 15. For example, the timing later than a task start timing T by an adjusted time difference d is set as the designated output timing, and the above predetermined output signal is set as the designated output signal value to generate output instruction data, which is then transmitted to the timing designation output unit 15. The timing designation output unit 15, which has received the output instruction data, outputs an output signal at the timing later than the task start timing T by the time difference d (adjusted input/output change timing $t_A$). FIG. 13 is a diagram describing a method for reflecting the adjusted input/output change timing in the operation of the control system.

In this manner, the input-output timing adjustment unit 319' can adjust the input change timing and/or the output change timing. The timing designation input unit 13 and/or the timing designation output unit 15 causes the operation of the control system 200 to reflect the adjusted input change timing and/or the adjusted output change timing. This allows the input unit 13 to independently adjust the timing at which the input signal is input (input change timing), and the output unit 15 to independently adjust the timing at which the output signal is output (output change timing). As a result, the control system can adjust devices more accurately and more precisely. In other words, the input unit 13 can independently adjust the input change timing based on the operational speed of the input unit 13, whereas the output unit 15 can independently adjust the output change timing based on the operational speed of the output unit 15.

For example, the input signal obtaining timing in the input unit 13 and the output signal outputting timing in the output unit 15 can be easily adjusted in accordance with the processing of the input unit 13 and/or the output unit 15 that takes the longest time to complete in the control system 200 (this can be visually determined based on the predictive input signal data, the predictive output signal data, and the variable sampling data 1137a displayed on the same time axis).

3. Advantageous Effects of Embodiments

The first embodiment and the second embodiment have the configurations and functions described below.

The control system 100 (an example of a control system) according to the first embodiment includes the PLC system 1 (an example of a PLC system) and the development support apparatus 3 (an example of a development support apparatus).

The PLC system 1 includes the input unit 13 (an example of an input unit), the output unit 15 (an example of an output unit), and the controller 11 (an example of a controller). The input unit 13 obtains the actual sampling data 1137b (an example of actual sampling data) storing the first sampling value and the first sampling timing that are associated with each other. The first sampling value is the value sampled at the first timing. The first sampling timing is the timing at which the input signal is sampled.

The output unit 15 outputs the output signal based on the output instruction data including the designated output timing and the designated output signal value. The designated output signal value is the output signal value to be output at the designated output timing.

The controller 11 includes the task execution unit 1111 (an example of a task execution unit) and the sampling unit 1113 (an example of a sampling unit).

The task execution unit 1111 repeatedly executes a task including the I/O refresh processing and the processing for the user program in every predetermined period. The I/O refresh processing is the processing for updating the input variable value associated with the input signal based on the input signal, and updating the output signal based on the output variable associated with the output signal. The processing for the user program is the processing that executes the user program 1131 (an example of a user program) based on the input variable to calculate the output variable value, calculate the designated output timing and the designated output signal value based on the output variable value, and transmit the output instruction data to the output unit 15.

The sampling unit 1113 obtains the variable sampling data 1137a (an example of variable sampling data) storing the second sampling value and the second sampling timing that are associated with each other. The second sampling value is obtained by sampling the input variable, the output variable, and/or the internal variable at the second timing. The internal variable is the variable used in the user program 1131. The second sampling timing is the timing at which the input variable, the output variable, and/or the internal variable is sampled.

The development support apparatus 3 includes the same time-series data generation unit 313 (an example of a same time-series data generation unit) and the same time-series data display unit 315 (an example of a same time-series data display unit).

The same time-series data generation unit 313 generates the same time-series data. The first sampling timing, the second sampling timing, and the designated output timing are arranged in the same time series. The first sampling value, the second sampling value, and the designated output signal value are associated with the timings in the same time series corresponding to the first sampling timing, the second sampling timing, and the designated output timing, and are stored as the same time-series data.

The same time-series data display unit 315 displays the same time-series data on the same time axis.

In the control system 100, the input unit 13 samples the input signal at the first timing to obtain the first sampling value, and samples the timing at which the input signal is sampled to obtain the first sampling timing, and obtains the actual sampling data storing the first sampling value and the first sampling timing that are associated with each other.

The sampling unit 1113 in the controller 11 samples the input variable, the output variable, and/or the internal variable at the second timing to obtain the second sampling value, and samples the timing at which the variable is sampled to obtain the second sampling timing, and obtains the variable sampling data 1137a storing the second sampling value and the second sampling timing that are associated with each other.

Further, when the task execution unit 1111 in the controller 11 executes the processing for the user program, the user program calculates the output variable value based on the input variable, calculates the designated output timing and the designated output signal value to be output at the designated output timing based on the output variable value, and transmits the output instruction data including the designated output timing and the designated output signal value to the output unit 15.

In the development support apparatus 3, the same time-series data generation unit 313 arranges the first sampling timing, the second sampling timing, and the designated output timing in the same time series. The same time-series data generation unit 313 then generates the same time-series data storing the first sampling value, the second sampling value, and the designated output signal value that are associated with the timings in the same time series corresponding to the first sampling timing, the second sampling timing, and the designated output timing. The same time-series data display unit 315 then displays the same time-series data.

In this manner, the above control system aligns the actual sampling data 1137*b*, the variable sampling data 1137*a*, and the output instruction data in the same time series to generate the single set of same time-series data. The development support apparatus 3 displays the same time-series data on the same time axis. This allows checking of the relationship between the above sampling result and the designated output signal value on the same time axis, without performing the procedure for aligning individual data pieces. This allows easy adjustment of devices without placing a large burden on, for example, a system developer.

The input unit 13 may include the high-speed sampling input unit 13 (an example of a high-speed sampling input unit). The high-speed sampling input unit 13 is an input unit that samples the first sampling value in every high-speed sampling period shorter than the predetermined period for executing a task, and sets the timing determined by the high-speed sampling period as the first sampling timing. This allows sampling of the input signal more accurately in a period shorter than the predetermined period, which is the execution period for a task.

The input unit 13 may include the change timing obtaining input unit 13 (an example of a change timing obtaining input unit). The change timing obtaining input unit 13 is an input unit that sets the timing at which the input signal undergoes a predetermined change as the first timing, sets the input signal value after the predetermined change as the first sampling timing, and sets the timing determined by the first sampling timing as the first sampling timing. This allows accurate sampling of the timing at which the input signal undergoes the predetermined change together with the input signal value at the timing of change, independently of the execution period for a task (predetermined period).

The input unit 13 may receive the input signal at the designated input timing. This allows reception of the input signal, independently of the execution period for a task (predetermined period).

The input unit 13 may receive the input signal at the predetermined timing that is a timing determined by a high-speed input period shorter than the predetermined period. This allows reception of the input signal in a period shorter than the execution period for a task (predetermined period), independently of the execution period for a task.

The output unit 15 may include the high-speed output unit 15 (an example of a high-speed output unit). The high-speed output unit 15 is an output unit that sets the timing determined by the high-speed output period shorter than the predetermined period for executing a task as the designated output timing, sets the signal value to be output in every high-speed output period as the designated output signal value, and outputs the output signal. The high-speed output unit 15 outputs the output signal to control the output signal more precisely in a period shorter than the predetermined period, independently of the execution period for a task (predetermined period).

The output unit 15 may include the timing designation output unit 15 (an example of a timing designation output unit). The timing designation output unit 15 is an output unit that sets the predetermined timing as the designated output timing, sets the signal value to be output at the predetermined timing as the designated output signal value, and outputs the output signal. This allows output of the output signal with any signal value at a predetermined timing, independently of the execution period for a task (predetermined period).

The control system 100 according to the first embodiment may further include the common timers 1117, 133, and 153 (examples of a common timer). The common timers 1117, 133, and 153 obtain the first sampling timing, the second sampling timing, and the designated output timing at the common timing. This reduces differences between the timing obtained in the input unit 13, the timing obtained in the output unit 15, and the timing obtained in the controller 11 in the above control system.

The output unit 15 may associate the sampling output signal value obtained by sampling the output signal at the predetermined timing with an output sampling timing determined by the predetermined timing in the actual sampling data 1137*b*. This allows sampling of the actual output signal.

The same time-series data generation unit 313 may further arrange the output sampling timing in the same time series, and may associate the sampling output signal with the timing in the same time series corresponding to the output sampling timing in the same time-series data. This allows the sampling result of the actual output signal to be displayed on the same time axis.

The control system 200 (an example of the control system) according to the second embodiment includes the PLC system 1 (an example of the PLC system) and the development support apparatus 3 (an example of the development support apparatus).

The PLC system 1 includes the input unit 13 (an example of the input unit), the output unit 15 (an example of the output unit), and controller 11 (an example of the controller). The input unit 13 receives the input signal. The output unit 15 outputs the output signal.

The controller 11 includes the task execution unit 1111 (an example of the task execution unit) and the sampling unit 1113 (an example of the sampling unit).

The task execution unit 1111 repeatedly executes a task including the I/O refresh processing and the processing for the user program in every predetermined period. The I/O refresh processing is the processing for updating the input variable value associated with the input signal based on the input signal, and updating the output signal based on the output variable value associated with the output signal. The processing for the user program is the processing that executes the user program 1131 (an example of the user program) based on the input variable to calculate the output variable value.

The sampling unit 1113 obtain the variable sampling data 1137*a* (an example of the variable sampling data) storing the second sampling value and the second sampling timing that are associated with each other. The second sampling value is obtained by sampling the input variable, the output variable, and/or the internal variable at the second timing. The internal variable is the variable used in the user program. The second sampling timing is the timing at which the input variable, the output variable, and/or the internal variable is sampled.

The development support apparatus 3 includes the input-output change timing prediction unit 313' (an example of an input-output change timing prediction unit), the predictive input-output signal generation unit 315' (an example of a predictive input-output signal generation unit), and the same time-series data display unit 317' (an example of the same time-series data display unit).

The input-output change timing prediction unit 313' predicts the input change timing and/or the output change timing based on the connection between the input unit 13 and/or the output unit 15, and the controller 11, the communication speed, the operational speed for performing a predetermined operation in the input unit 13 and/or the output unit 15, and the second sampling timing. The input change timing is the timing at which the signal value of the input signal changes to the value corresponding to the input variable value at the second sampling timing. The output change timing is the timing at which the signal value of the output signal changes to the value corresponding to the output variable value at the second sampling timing.

The predictive input-output signal generation unit 315' generates the predictive input signal data and/or the predictive output signal data. The predictive input signal data is generated by associating the input variable value at the second sampling timing with the input change timing. The predictive output signal data is generated by associating the output variable value at the second sampling timing with the output change timing.

The same time-series data display unit 317' displays the variable sampling data, the predictive input signal data, and/or the predictive output signal data on the same time axis.

In the above control system, the sampling unit 1113 in the controller 11 samples the input variable, the output variable, and/or the internal variable and sets the sampled data as the second sampling value, and samples the timing at which the input variable, the output variable, and/or the internal variable is sampled and sets the sampled timing as the second sampling timing to obtain the variable sampling data 1137a.

In the development support apparatus 3, the input-output change timing prediction unit 313' predicts the input change timing that is the timing at which the signal value of the input signal changes to the value corresponding to the input variable value at the second sampling timing, and/or the output change timing that is the timing at which the signal value of the output signal changes to the value corresponding to the output variable value at the second sampling timing, based on the connection between the input unit and/or the output unit with the controller, the communication speed, and the second sampling timing.

The predictive input-output signal generation unit 315' associates the input variable value at the second sampling timing with the input change timing to generate the predictive input signal data, and associates the output variable value at the second sampling timing with the output change timing to generate the predictive output signal data.

Further, the same time-series data display unit 317' displays the variable sampling data 1137a, the predictive input signal data, and/or the predictive output signal data on the same time axis.

The above structure allows prediction of the timing for receiving or latching the input signal input to the input unit 13 and/or the actual output signal output from the output unit 15 based on the variables used in the controller 11, without sampling the input signal and/or the output signal. This further allows checking of the relationship between the above sampling results of the variables and the predictive input signal and/or the predictive output signal on the same time axis, without performing the procedure for aligning individual data pieces. This allows easy adjustment of devices without placing a large burden on, for example, a system developer.

The development support apparatus 3 may further include the input-output timing adjustment unit 319' (an example of an input-output timing adjustment unit). The input-output timing adjustment unit 319' adjusts the input change timing and/or the output change timing. This allows the input unit 13 to independently adjust the timing at which the input signal is input (input change timing), and allows the output unit 15 to independently adjust the timing at which the output signal is output (output change timing). As a result, the control system 200 can adjust devices more accurately and more precisely.

The output unit 15 may output the output signal based on the output instruction data including the designated output timing and the designated output signal value to be output at the designated output timing. This allows output of the output signal independently of the execution period for a task (predetermined period).

The designated output timing may be set as the output change timing, and the designated output signal may be set as the output variable value at the second sampling timing. This allows the output unit to reflect the output change timing adjusted in the input-output timing adjustment unit 319'.

The designated input timing may be the input change timing. This allows the input unit to reflect the input change timing adjusted in the input-output timing adjustment unit 319'.

4. Other Embodiments

The embodiments disclosed herein should not be construed to be restrictive, but may be modified within the spirit and scope of the claimed invention. The embodiments and modifications herein may be combined freely as appropriate.

INDUSTRIAL APPLICABILITY

One or more embodiments are widely applicable to PLC systems and control systems capable of sampling input and output signals and internal variables.

REFERENCE SIGNS LIST 100, 200 control system
1 PLC system
11 controller
111 CPU
1111 task execution unit
1113 sampling unit
1117 common timer
1119 transmission-reception unit
113 RAM
1131 user program
1135 variable storage area
1137 sampling data storage area
1137a variable sampling data
1137b actual sampling data
115 ROM
115a system program
117 communication interface
13 input unit 131 signal input unit
133 common timer
135 input data storage unit
135a input signal data
137 input signal sampling unit
15 output unit
151 signal output unit
153 common timer
155 output data storage unit
155a output signal data
157 output signal sampling unit
17 power supply unit
3 development support apparatus
31 CPU
311 sampling data reception unit
311' sampling data reception unit
313 same time-series data generation unit
313' input-output change timing prediction unit
315 same time-series data display unit
315' predictive input-output signal generation unit
317' same time-series data display unit
319' input-output timing adjustment unit
33 storage unit
33a development support program
35 operation unit
37 communication interface
39 display unit
5 signal input unit
7 control target device
a input variable
b output variable
B I/O bus
NW communication network
T task start timing
d adjusted time difference
$t_A$ adjusted input-output change timing

The invention claimed is:

1. A control system, comprising:
a Programmable Logic Controller (PLC) comprising a first processor configured with a first program to perform operations comprising:
operation as an input unit configured to obtain actual sampling data comprising a first sampling value and a first sampling timing that are associated with each other, the first sampling value comprising a value of an input signal obtained by sampling the input signal at the first sampling timing, the first sampling timing comprising a timing at which the input signal is sampled,
operation as an output unit configured to output an output signal based on output instruction data comprising a designated output timing and a designated output signal value, the output signal to be output to a target device,
operation as a task execution unit configured to repeatedly execute a task in a predetermined period, the task comprising I/O refresh processing for updating a value of an input variable associated with the input signal and updating the output signal based on an output variable associated with the output signal, and to perform operations of a user program, the operations of the user program comprising calculating a value of the output variable by executing the user program based on the input variable, calculating the designated output timing and the designated output signal value based on the value of the output variable to generate the output instruction data, and transmitting the output instruction data to the output unit, and
operation as a sampling unit configured to obtain variable sampling data comprising a second sampling value and a second sampling timing that are associated with each other, wherein the second sampling value is obtained by sampling the input variable, the output variable, and an internal variable used in the user program at the second sampling timing, the second sampling timing comprising a timing at which the input variable, the output variable, and the internal variable are sampled; and
a development support apparatus comprising a second processor configured with a second program to perform operations comprising:
operation as a same time-series data generation unit configured to generate same time-series data comprising the first sampling timing, the second sampling timing, and the designated output timing arranged in a same time series, wherein respective timings of the first sampling value, the second sampling value, and the designated output signal value are in the same time series corresponding to the first sampling timing, the second sampling timing, and the designated output timing, and
operation as a same time-series data display unit configured to display the same time-series data on a same time axis, wherein the target device is a motor, and wherein the position and motion of a rotating shaft of the motor are controlled according to the updated output signal.

2. The control system according to claim 1, wherein the first processor is configured with the first program to perform operations as the input unit such that operating as the input unit comprises operation as a high-speed sampling input unit configured to sample the first sampling value in every high-speed sampling period that is shorter than the predetermined period for executing the task, and set a timing determined by the high-speed sampling period as the first sampling timing.

3. The control system according to claim 1, wherein the first processor is configured with the first program to perform operations as the input unit such that operating as the input unit comprises operation as a change timing obtaining unit configured to set a timing at which the input signal undergoes a predetermined change as a first timing, set a signal value of the input signal after the predetermined change as the first sampling value, and set the first timing as the first sampling timing.

4. The control system according to claim 1, wherein the first processor is configured with the first program to perform operations such that operation as the input unit comprises receiving the input signal at a designated input timing.

5. The control system according to claim 4, wherein the first processor is configured with the first program to perform operations such that operation as the input unit comprises receiving the input signal at the designated input timing that is a timing determined by a high-speed input period that is shorter than the predetermined period.

6. The control system according to claim 1, wherein the first processor is configured with the first program to perform operations as the output unit such that operating as the output unit comprises operation as a high-speed output unit configured to set a timing determined by a high-speed output period that is shorter than the predetermined period for executing the task as the designated output timing, set a signal value to be output in every high-speed output period as the designated output signal value, and output the output signal.

7. The control system according to claim 1, wherein the first processor is configured with the first program to perform operations such that the output unit comprises a timing designation output unit configured to set a predetermined timing as the designated output timing, set a signal value to be output at the predetermined timing as the designated output signal value, and output the output signal.

8. The control system according to claim 1, wherein the first processor is configured with the first program to perform operations further comprising:
operation as a common timer configured to obtain the first sampling timing, the second sampling timing, and the designated output timing at a common timing.

9. The control system according to claim 1, wherein the first processor is configured with the first program to perform operations such that operation as the output unit comprises associating a sampling output signal value obtained by sampling the output signal at a predetermined timing with an output sampling timing determined by the predetermined timing in the actual sampling data.

10. The control system according to claim 9, wherein the second processor is configured with the second program to perform operations such that operation as the same time-series data generation unit comprises arranging the output sampling timing in the same time series, and associating the sampling output signal value with a timing in the same time series corresponding to the output sampling timing in the same time-series data.

11. A control system, comprising:
a Programmable Logic Controller (PLC) comprising a first processor configured with a first program to perform operations comprising:
operation as an input unit configured to receive an input signal,
operation as an output unit configured to output an output signal to a target device,
operation as a task execution unit configured to repeatedly execute a task in a predetermined period, the task comprising I/O refresh processing for updating an input variable associated with the input signal and updating the output signal based on an output variable associated with the output signal, and to perform operations of a user program, the operations of the user program comprising calculating a value of the output variable by executing the user program based on the input variable, and
operation as a sampling unit configured to obtain variable sampling data comprising a first sampling value and a first sampling timing, the first sampling value is obtained by sampling the input variable, the output variable, and an internal variable used in the user program at the first timing, the first sampling timing is a timing at which the input variable, the output variable, and the internal variable are sampled; and
a development support apparatus comprising a second processor configured with a second program to perform operations comprising:
operation as an input-output change timing prediction unit configured to predict an input change timing at which a signal value of the input signal changes to a value corresponding to an input variable value at the first sampling timing, and an output change timing at which a signal value of the output signal changes to a value corresponding to an output variable value at the first sampling timing based on a connection between the input unit and the output unit, a communication speed, an operational speed for performing a predetermined operation in the input unit and the output unit, and the first sampling timing,
operation as a predictive input-output signal generation unit configured to generate predictive input signal data by associating the input variable value at the first sampling timing with the input change timing, and to generate predictive output signal data by associating the output variable value at the first sampling timing with the output change timing, and
operation as a same time-series data display unit configured to display the variable sampling data, the predictive input signal data, and the predictive output signal data on a same time axis, wherein the target device is a motor, and wherein the position and motion of a rotating shaft of the motor are controlled according to the updated output signal.

12. The control system according to claim 11, wherein the second processor is configured with the second program to perform operations further comprising operation as an input-output timing adjustment unit configured to adjust the input change timing and the output change.

13. The control system according to claim 11, wherein the first processor is configured with the first program to perform operations such that operation as the output unit comprises outputting the output signal based on output instruction data comprising a designated output timing and a designated output signal value to be output at the designated output timing.

14. The control system according to claim 13, wherein the first processor is configured with the first program to perform operations such that the designated output timing is set as the output change timing, and the designated output signal value is set as the output variable value at the first sampling timing.

15. The control system according to claim 13, wherein the first processor is configured with the first program to perform operations such that operation as the output unit comprises operation as a high-speed output unit configured to set a timing determined by a high-speed output period that is shorter than the predetermined period for executing the task as the designated output timing, set a signal value to be output in every high-speed output period as the designated output signal value, and output the output signal.

16. The control system according to claim 13, wherein the first processor is configured with the first program to perform operations such that operation as the output unit comprises operation as a timing designation output unit configured to set a predetermined timing as the designated output timing, set a signal value to be output at the predetermined timing as the designated output signal value, and output the output signal.

17. The control system according to claim 11, wherein the first processor is configured with the first program to perform operations such that operation as the output unit comprises associating a sampling output signal value obtained by sampling the output signal at a predetermined timing with an output sampling timing determined by the predetermined timing in actual sampling data.

18. The control system according to claim 11, wherein the first processor is configured with the first program to perform operations such that operation as the input unit comprises receiving the input signal at a designated input timing.

19. The control system according to claim 18, wherein the first processor is configured with the first program to perform operations such that the designated input timing is the input change timing.

20. The control system according to claim 18, wherein the first processor is configured with the first program to perform operations such that operation as the input unit comprises setting a timing determined by a high-speed input period that is shorter than the predetermined period as the designated input timing, and receiving receive the input signal.

21. The control system according to claim 11, wherein the first processor is configured with the first program to perform operations further comprising:
  operation as a common timer configured to obtain the input change timing, the output change timing, and the first sampling timing at a common timing.

22. The control system according to claim 11, wherein the first processor is configured with the first program to perform operations such that operation as the input unit comprises obtaining actual sampling data comprising a first sampling value and a first sampling timing that are associated with each other, and the first sampling value is obtained by sampling an input signal at the first sampling timing, and the first sampling timing is a timing which the input signal is sampled.

23. The control system according to claim 22, wherein the first processor is configured with the first program to perform operations such that operation as the input unit comprises a high-speed sampling input unit configured to sample the first sampling value in every high-speed sampling period which is shorter than the predetermined period for executing the task, and set a timing determined by the high-speed sampling period as the first sampling timing.

24. The control system according to claim 22, wherein the first processor is configured with the first program to perform operations such that operation as the input unit comprises a change timing obtaining unit configured to set a timing at which the input signal undergoes a predetermined change as a first timing, set a signal value of the input signal after the predetermined change as the first sampling value, and set a timing determined by the first timing as the first sampling timing.

\* \* \* \* \*